United States Patent
Pattan et al.

(10) Patent No.: US 11,122,111 B2
(45) Date of Patent: *Sep. 14, 2021

(54) METHOD FOR MANAGING COMMUNICATION IN MISSION CRITICAL DATA (MCDATA) COMMUNICATION SYSTEM

(71) Applicant: Samsung Electronics Co., Ltd., Suwon-si (KR)

(72) Inventors: Basavaraj Jayawant Pattan, Bangalore (IN); Rajavelsamy Rajadurai, Bangalore (IN); Nishant Gupta, Bangalore (IN); Siva Prasad Gundur, Bangalore (IN); Sapan Pramodkumar Shah, Bangalore (IN); Vijay Sangameshwara, Bangalore (IN); Suresh Chitturi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/926,589

(22) Filed: Jul. 10, 2020

(65) Prior Publication Data

US 2021/0021667 A1    Jan. 21, 2021

Related U.S. Application Data

(63) Continuation of application No. 16/334,710, filed as application No. PCT/KR2017/010264 on Sep. 19, 2017, now Pat. No. 10,715,582.

(30) Foreign Application Priority Data

Sep. 19, 2016 (IN) .............................. 201641031911
Sep. 29, 2016 (IN) .............................. 201641033346
Sep. 18, 2017 (IN) .............................. 201641031911

(51) Int. Cl.
*H04L 29/08* (2006.01)
*H04L 29/06* (2006.01)
(Continued)

(52) U.S. Cl.
CPC .............. *H04L 67/06* (2013.01); *H04L 63/08* (2013.01); *H04L 65/1006* (2013.01);
(Continued)

(58) Field of Classification Search
CPC ..... H04L 67/06; H04L 63/08; H04L 65/1006; H04L 65/1073; H04L 65/4076;
(Continued)

(56) References Cited

U.S. PATENT DOCUMENTS 8,856,869 B1 *  10/2014  Brinskelle ............... G06F 21/31
                                                                726/2
9,635,531 B2    4/2017   Lim et al.
(Continued)

FOREIGN PATENT DOCUMENTS

KR    10-2013-0048561 A    5/2013
WO    2016/111528 A1       7/2016

OTHER PUBLICATIONS

International Search Report dated Dec. 15, 2017 in connection with International Patent Application No. PCT/KR2017/010264, 3 pages.
(Continued)

*Primary Examiner* — Wing F Chan
*Assistant Examiner* — Billy H Ng

(57) ABSTRACT

Embodiments herein achieve systems and methods for managing communication in a Mission Critical data (MCData) communication system. The proposed method and system provides file distribution and data streaming in the MCData communication system. The proposed method and system provides a functional model and mechanisms to support mission critical data services. The functional model to
(Continued)

support file distribution and data streaming, and associated procedures including one-to-one, one-to-many, and group data communications. Further, the proposed method and system provides mechanisms for optimizing radio resource utilization and backhaul link utilization in the MCData communication system. The proposed method and system provides radio resource utilization of the PC5 interface for the MC service, when multiple group members are under a relay node. Further, the proposed method and system can be used to reduce number of unicast transmissions between the MCData server and the MCData UEs by local routing at the relay node.

18 Claims, 17 Drawing Sheets

(51) Int. Cl.
  *H04W 28/06* (2009.01)
  *H04W 4/02* (2018.01)
  *H04W 40/22* (2009.01)
  *H04W 4/06* (2009.01)
(52) U.S. Cl.
  CPC ...... *H04L 65/1073* (2013.01); *H04L 65/4076* (2013.01); *H04L 67/02* (2013.01); *H04L 67/28* (2013.01); *H04L 69/14* (2013.01); *H04W 4/02* (2013.01); *H04W 4/06* (2013.01); *H04W 28/06* (2013.01); *H04W 40/22* (2013.01)
(58) Field of Classification Search
  CPC ......... H04L 67/02; H04L 67/28; H04L 69/14; H04W 4/02; H04W 4/06; H04W 28/06; H04W 40/22
  See application file for complete search history.

(56) References Cited

U.S. PATENT DOCUMENTS

| | | | |
|---|---|---|---|
| 10,404,663 | B1* | 9/2019 | Petrukhin ............ H04L 63/0281 |
| 2008/0068447 | A1* | 3/2008 | Mattila .................. H04N 7/147 |
| | | | 348/14.08 |
| 2014/0297805 | A1 | 10/2014 | Chaplot et al. |
| 2015/0326302 | A1 | 11/2015 | Stojanovski et al. |
| 2016/0212683 | A1 | 7/2016 | Freeman |

OTHER PUBLICATIONS

Written Opinion of the International Searching Authority dated Dec. 15, 2017 in connection with International Patent Application No. PCT/KR2017/010264, 7 pages.

"3rd Generation Partnership Project; Technical Specification Group Services and System Aspects; Mission Critical Data services over LTE Release 14", 3GPP TS 22.282 V14.0.0 (Jun. 2016), 16 pages.

"3rd Generation Partnership Project; Technical Specification Group Services and System Aspects; Study on application architecture to support Mission Critical Push to Talk over LTE (MCPTT) services (Release 13)", 3GPP TR 23.779 V0.7.1 (May 2015), 152 pages.

Supplementary European Search Report dated Jul. 11, 2019 in connection with European Patent Application No. 17 85 1148, 10 pages.

Korean Office Action dated Jul. 14, 2021, in connection with a counterpart Korean application No. 10-2019-700338, 12 pages.

3rd Generation Partnership Project; Technical Specification Group Services and System Aspects; Mission Critical Data services over LTE (Release 14) 3GPP TS 22.282 V2.2.0, Jun. 2016, 16 pages.

* cited by examiner

[Fig. 1A]
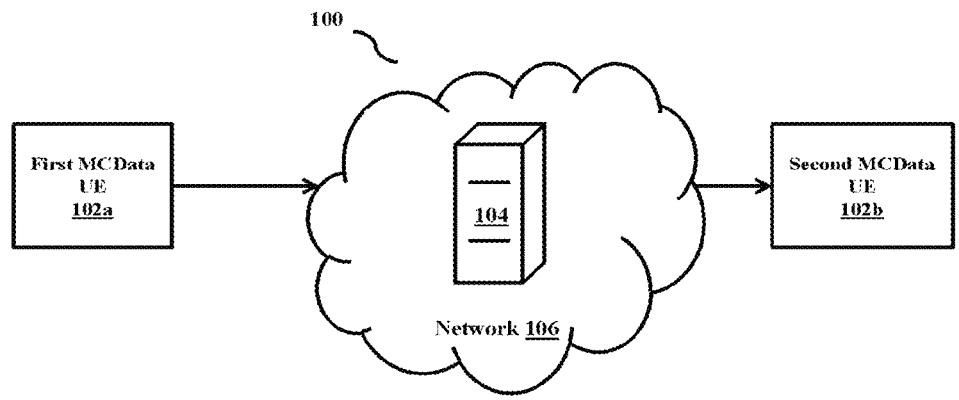
[Fig. 1B]
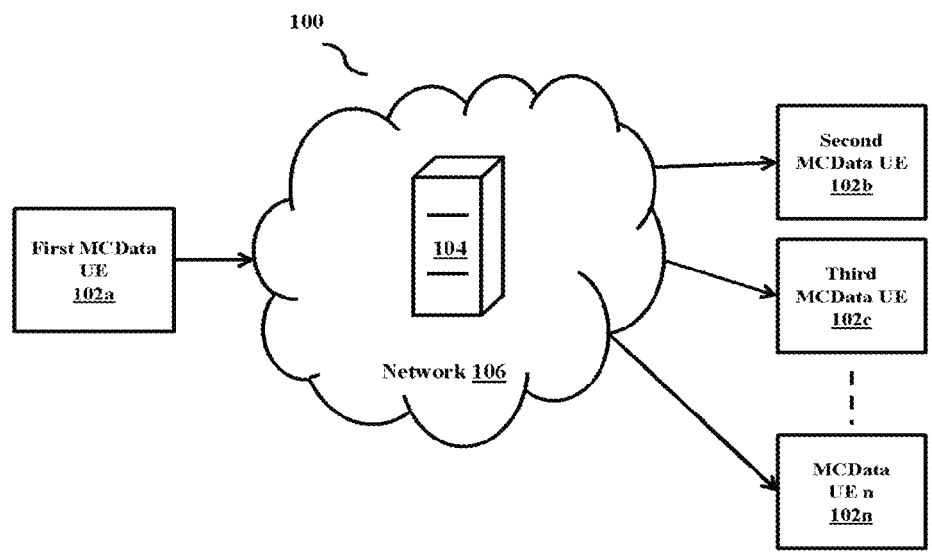

[Fig. 1C]
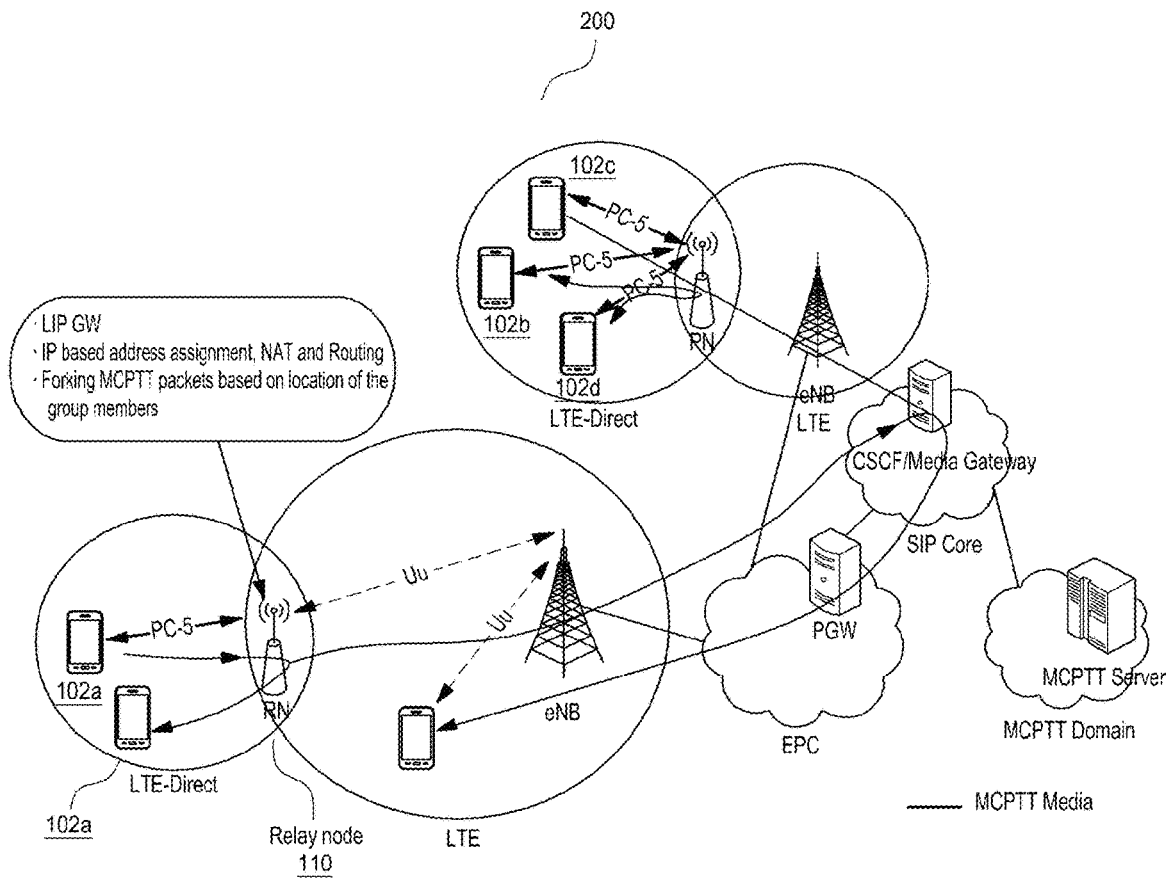
[Fig. 2]
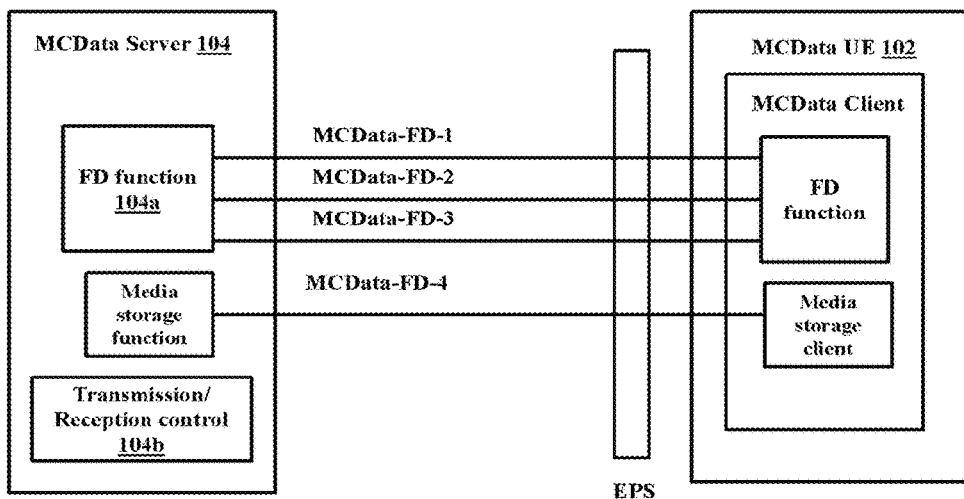

[Fig. 3]
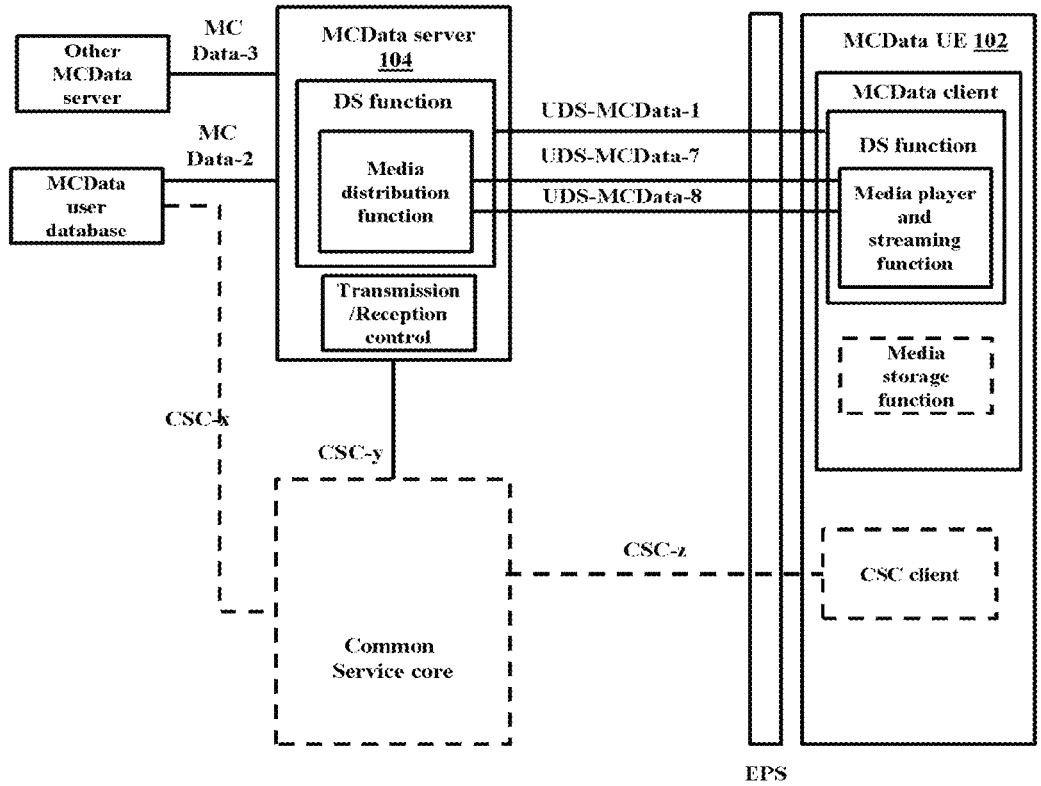
[Fig. 4]
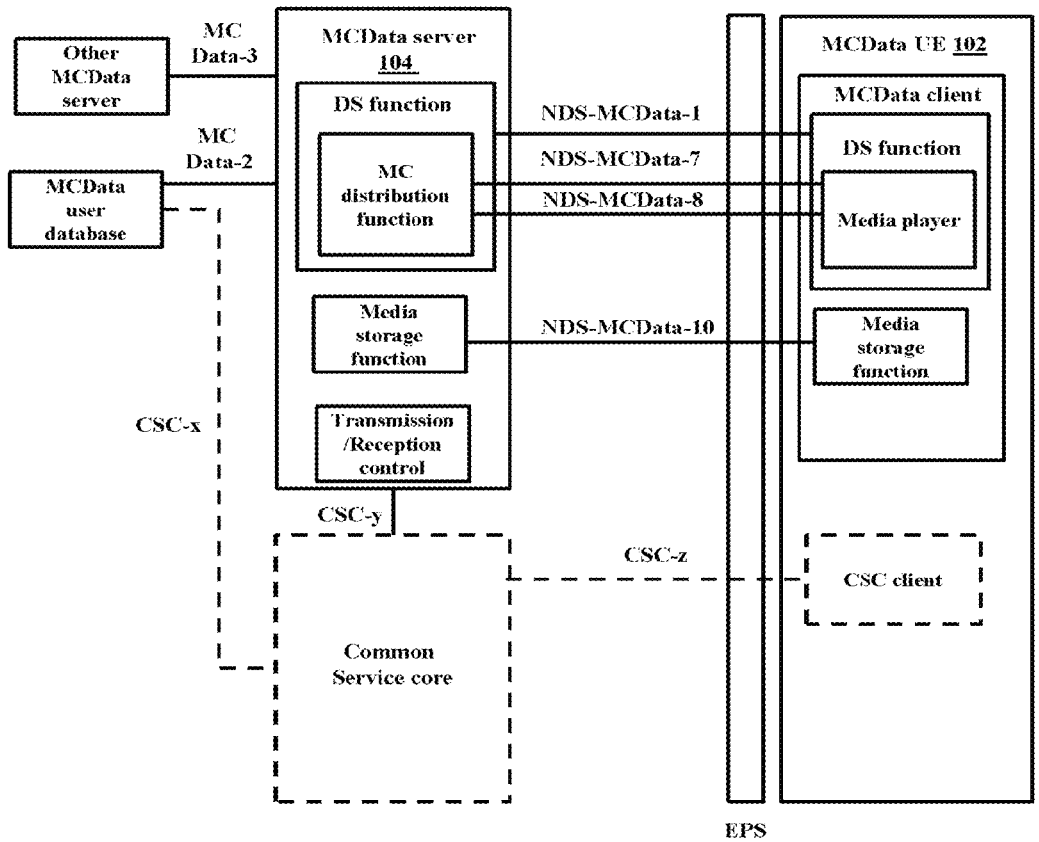

[Fig. 5]
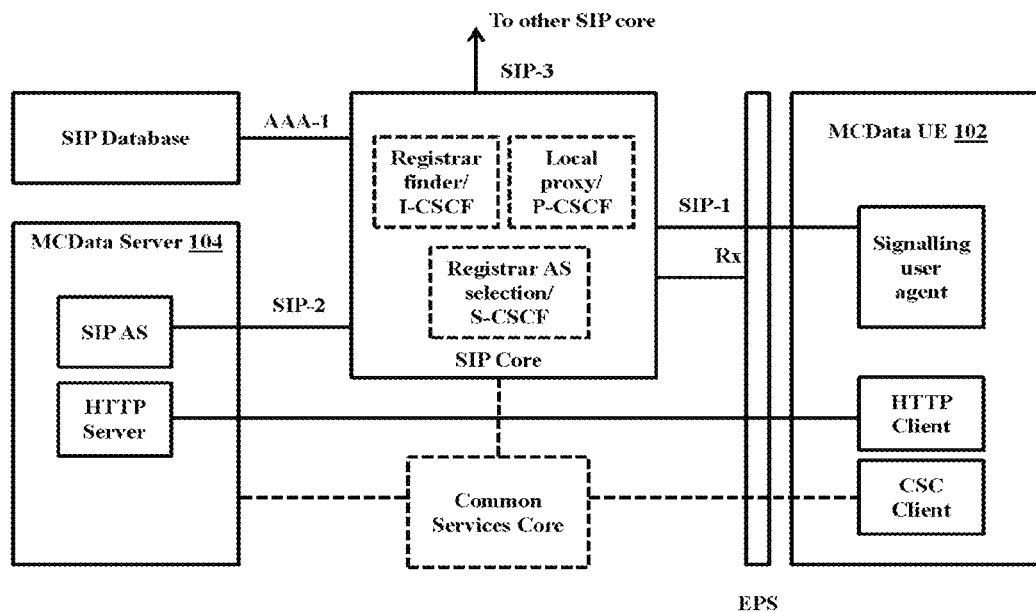
[Fig. 6]
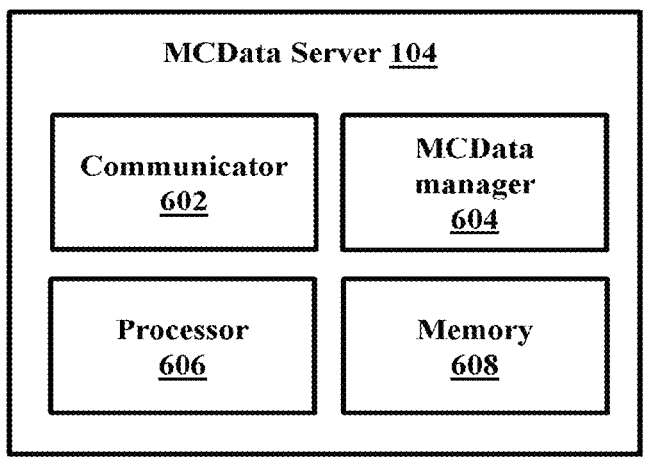

[Fig. 7]
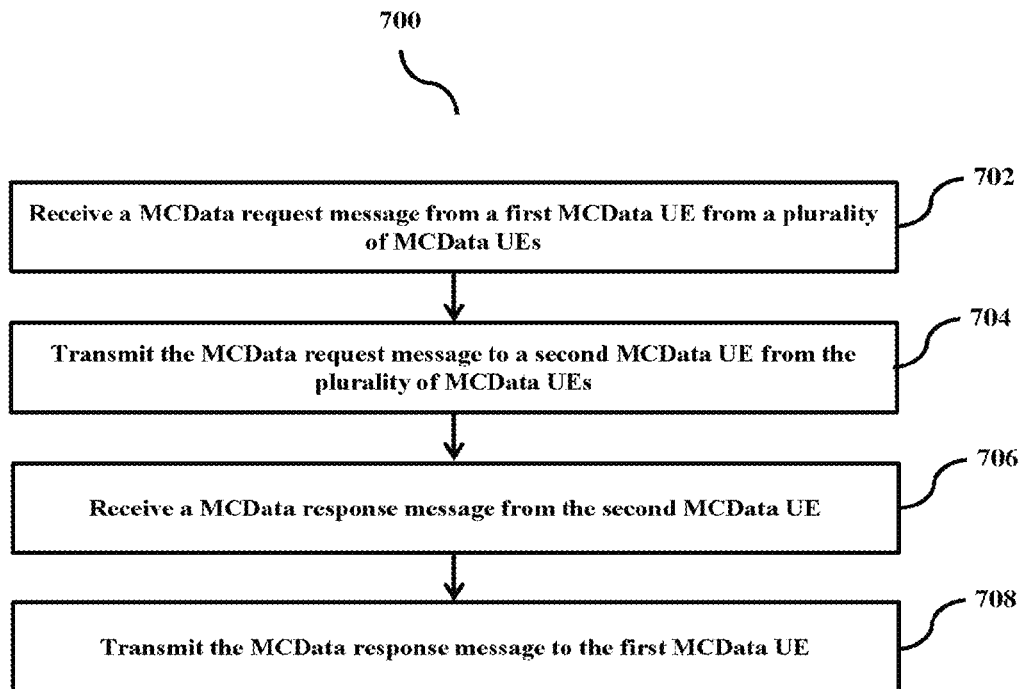
[Fig. 8]
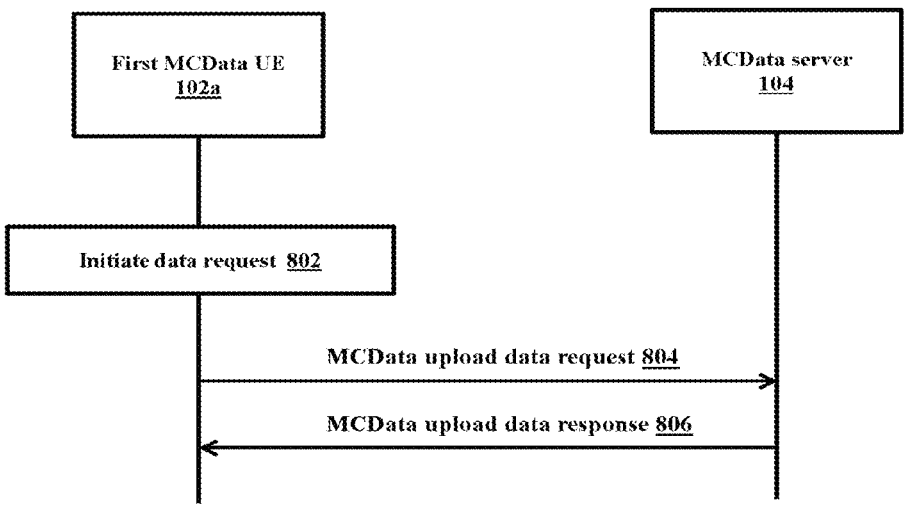

[Fig. 9]
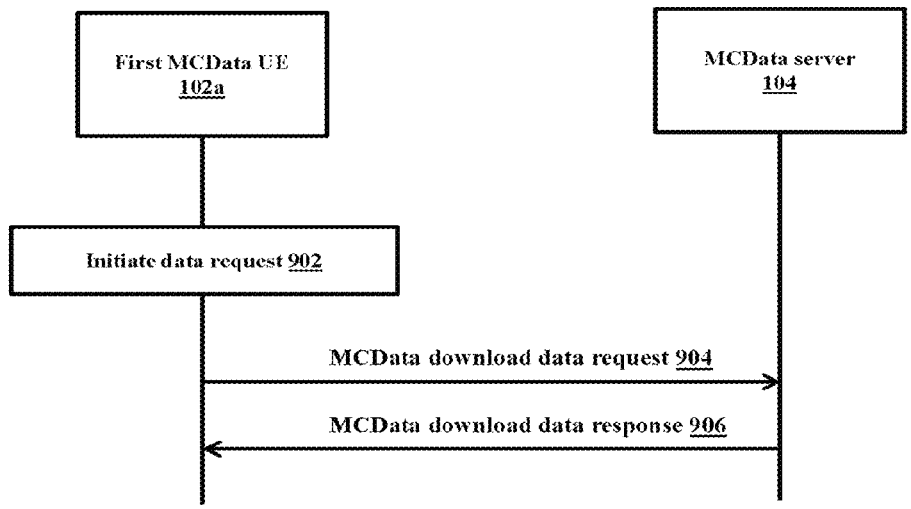
[Fig. 10]
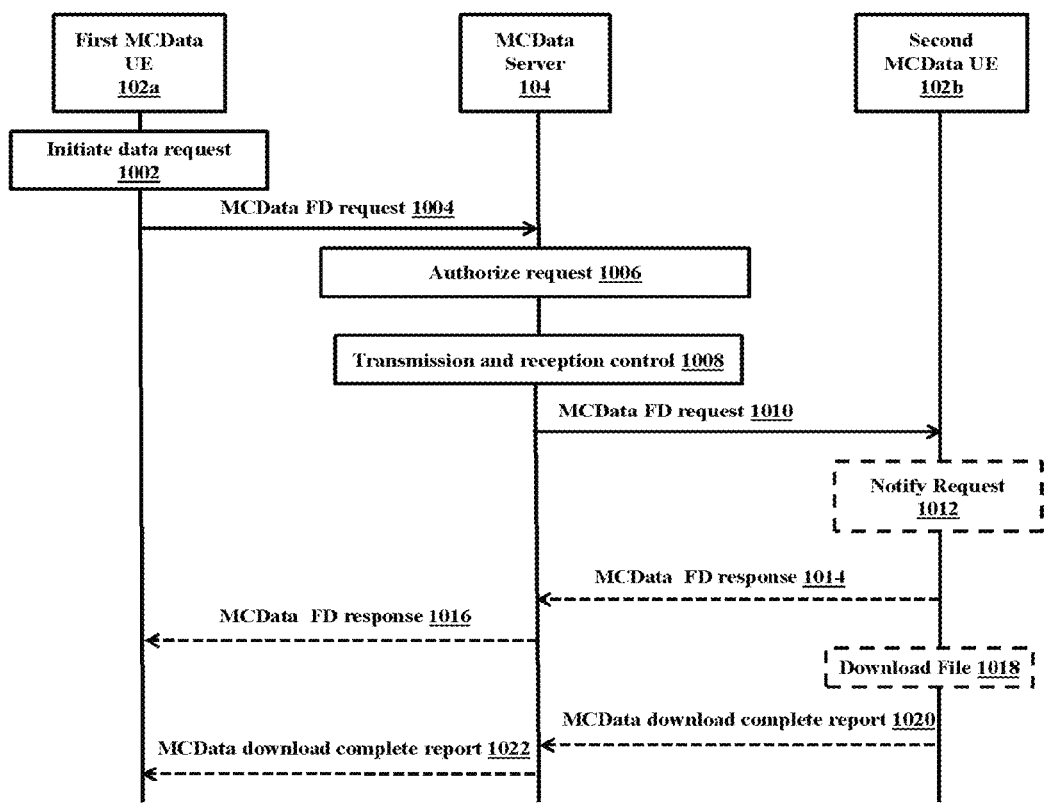

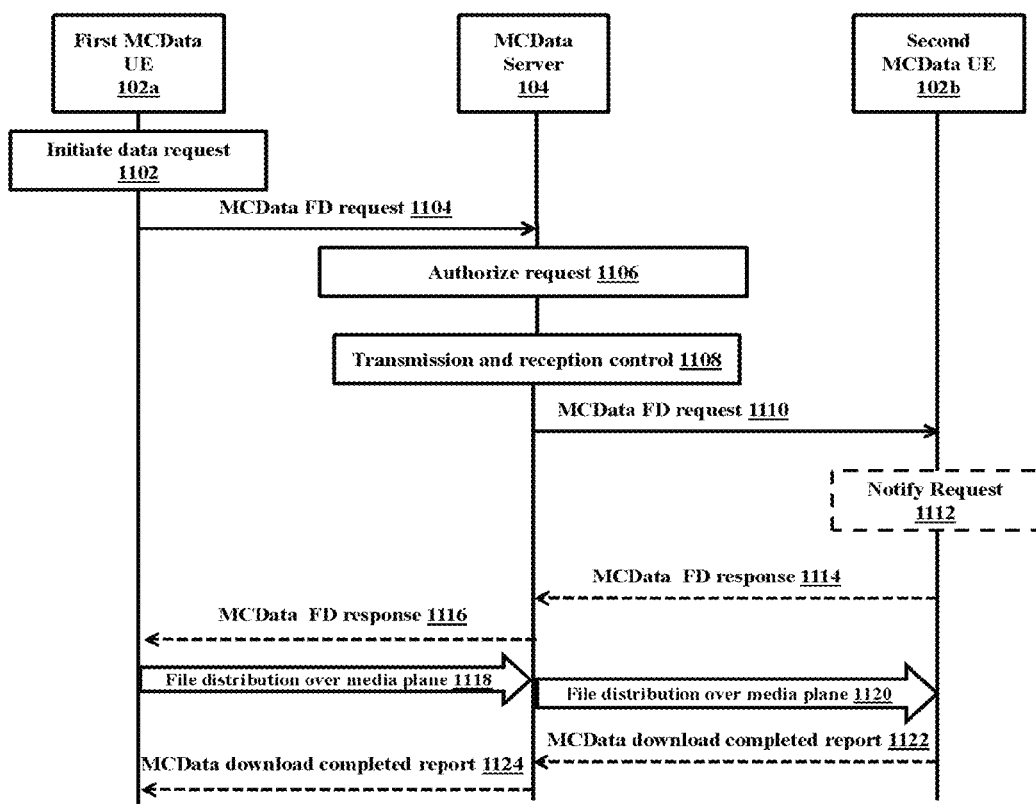
[Fig. 11]

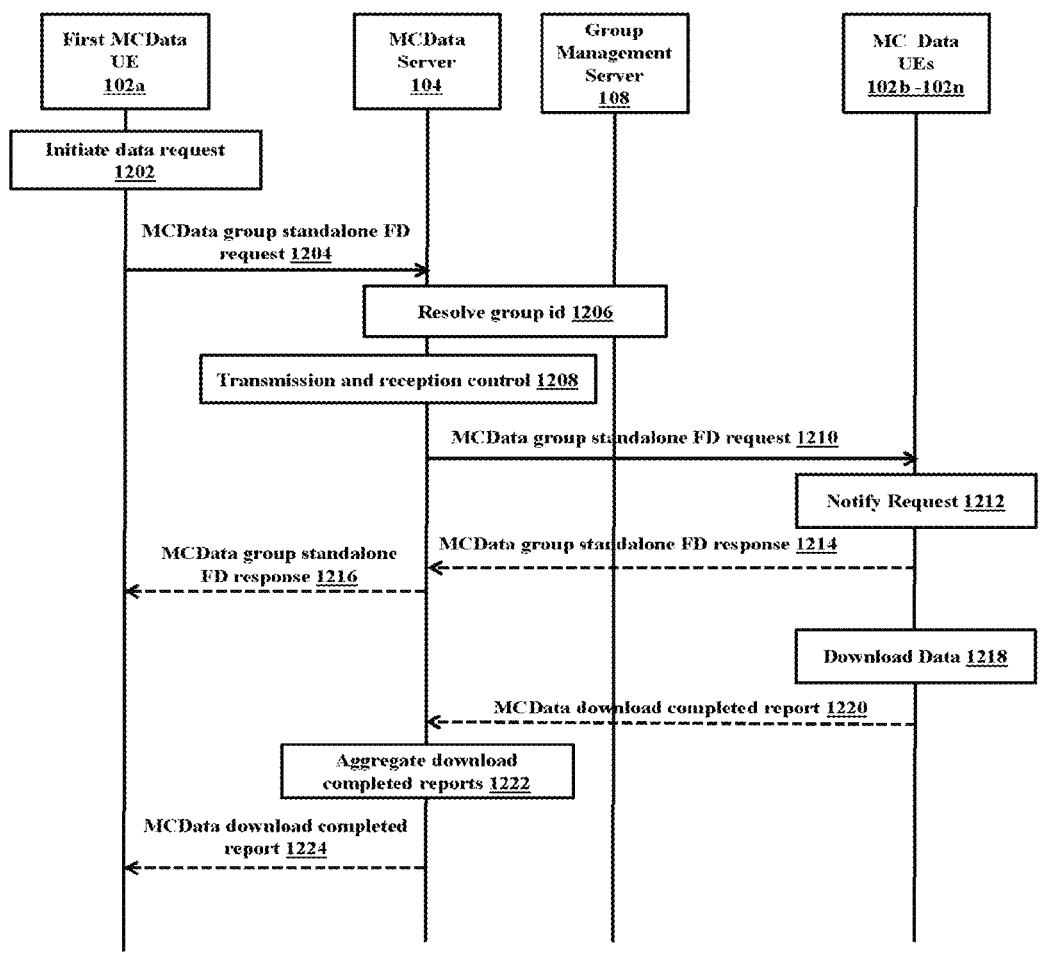

[Fig. 13]
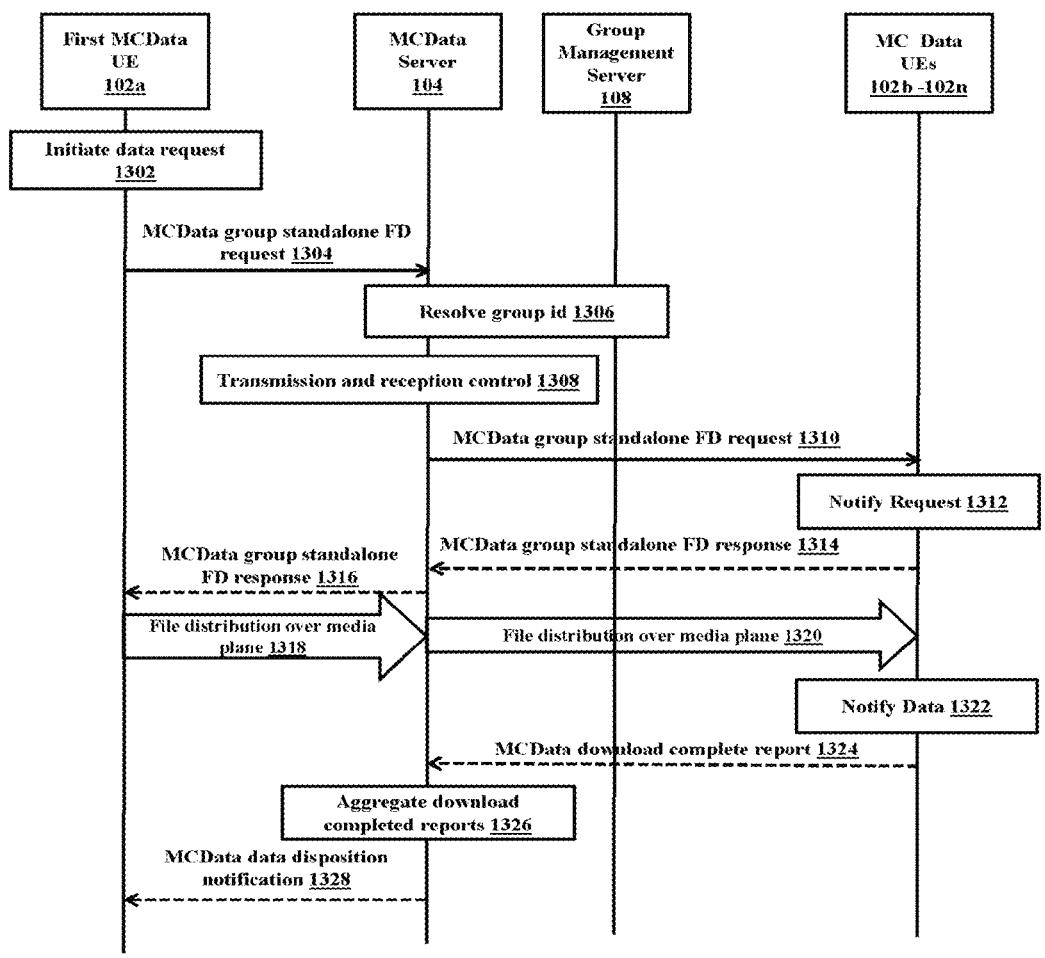

[Fig. 14]
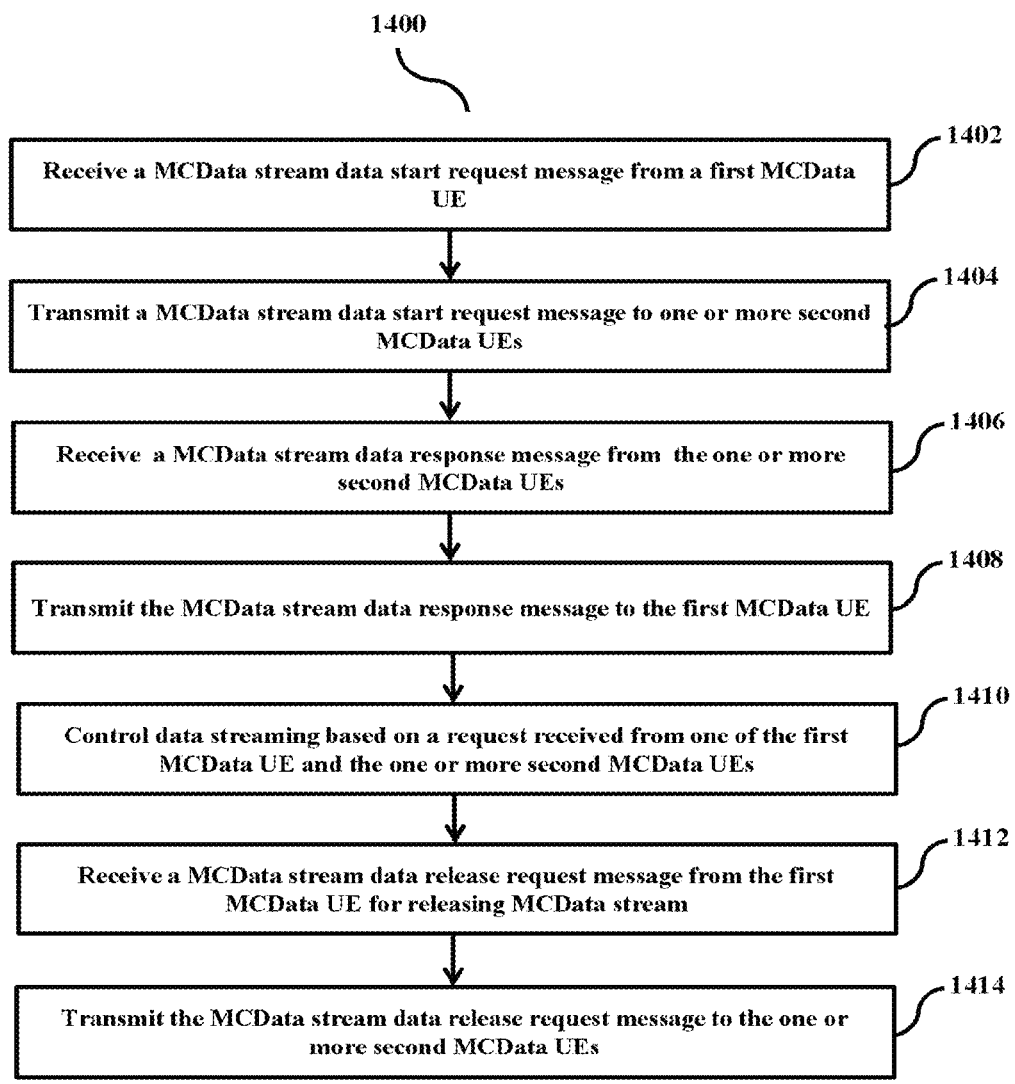

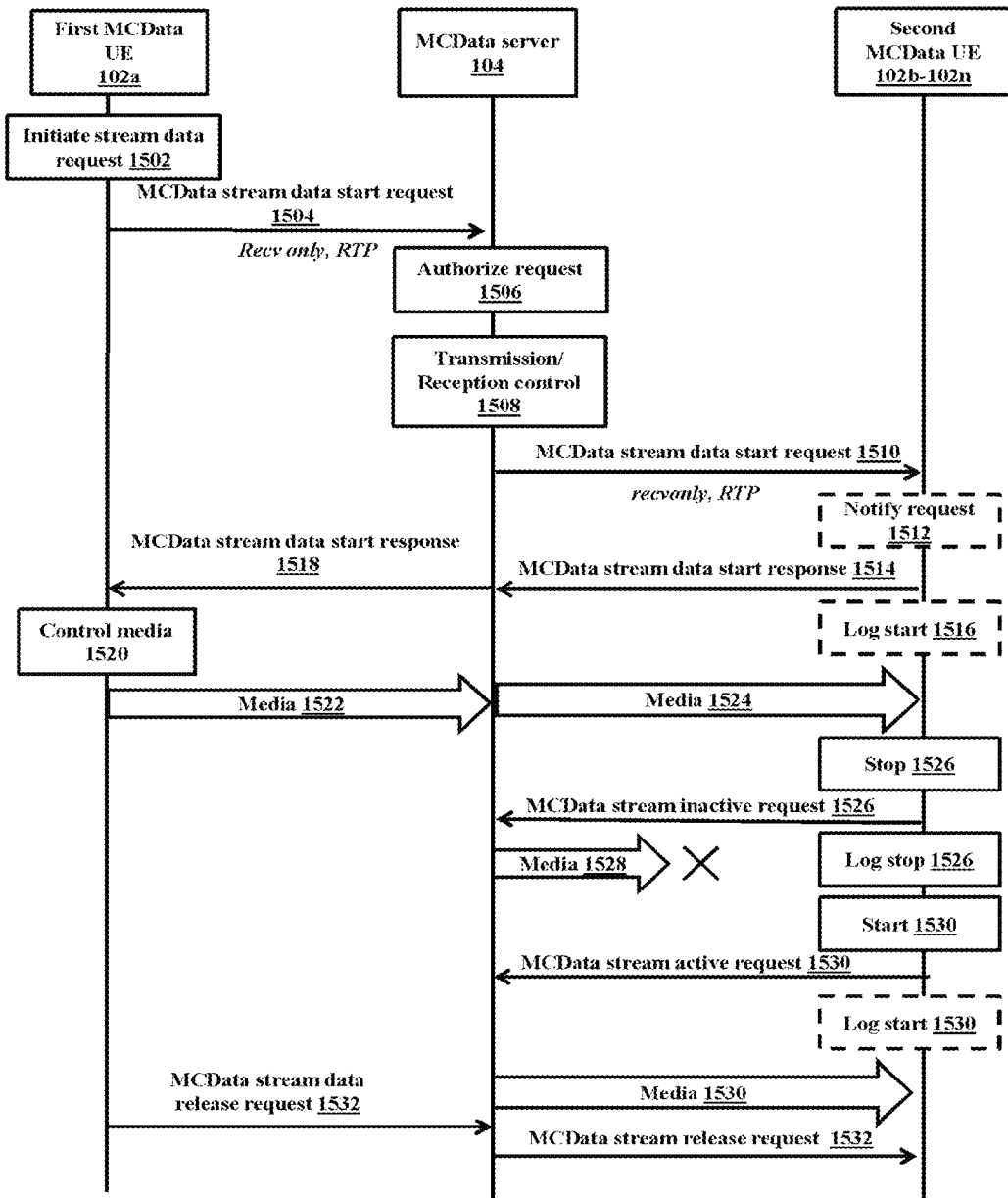
[Fig. 15A]

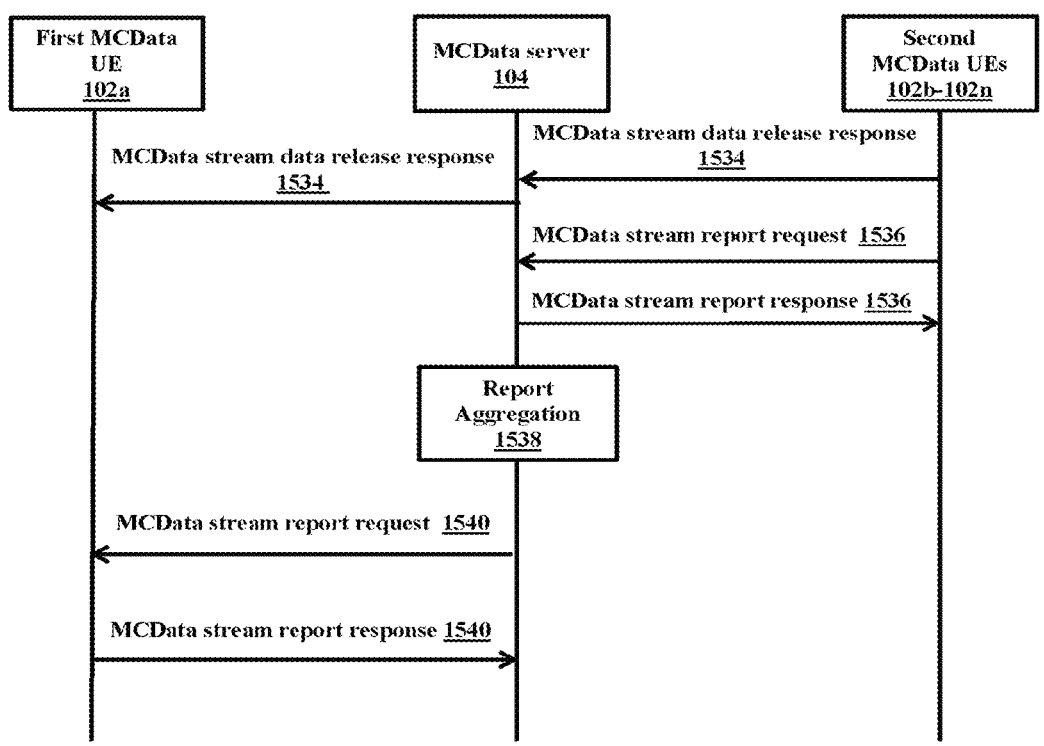
[Fig. 15B]

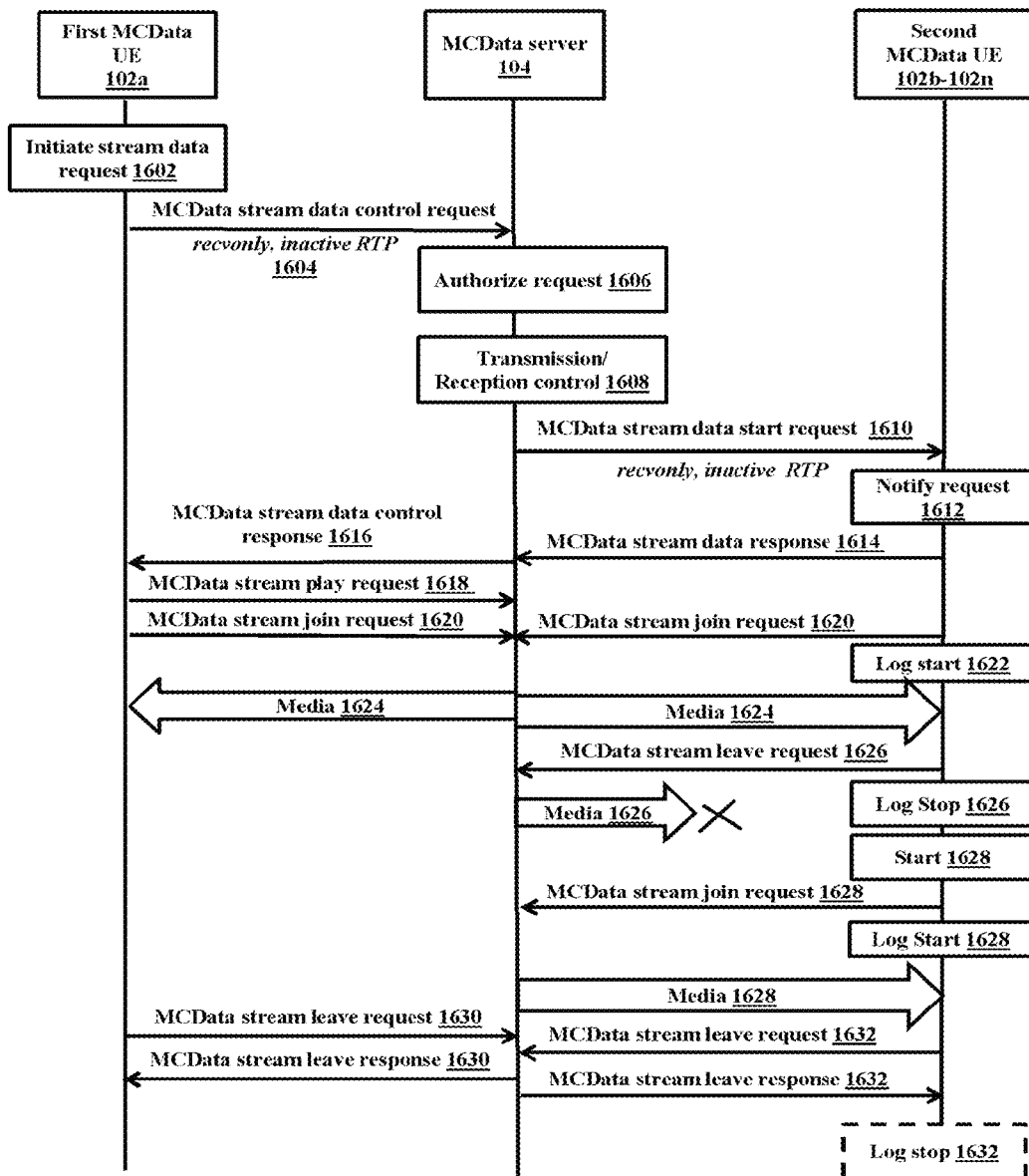
[Fig. 16A]

[Fig. 16B]
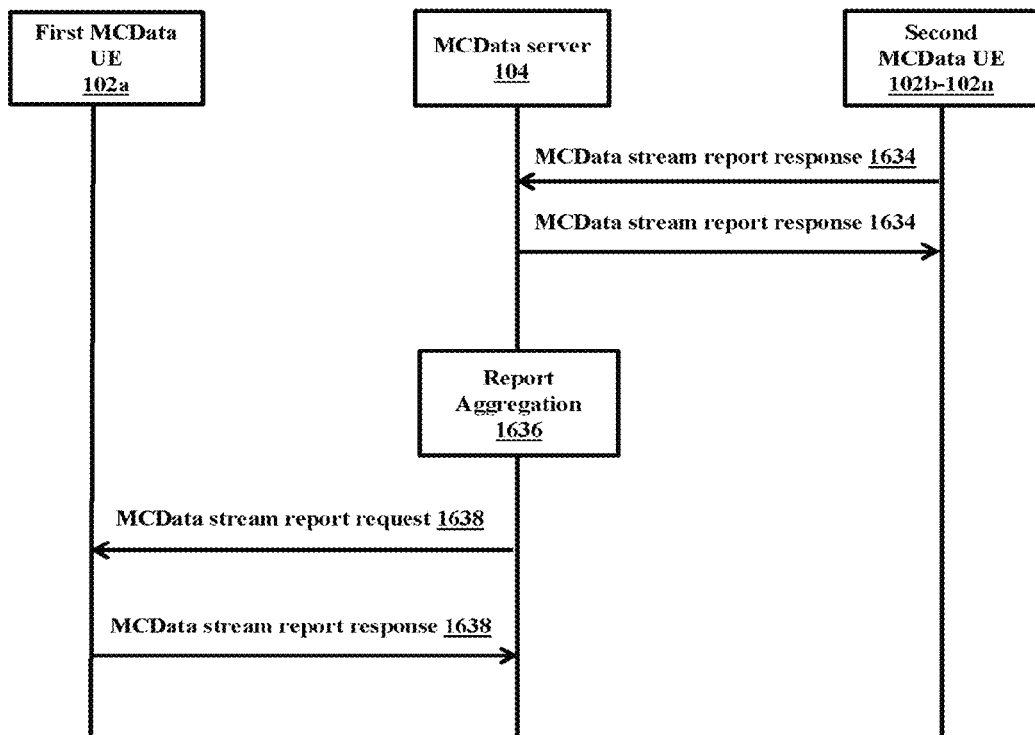
[Fig. 17]
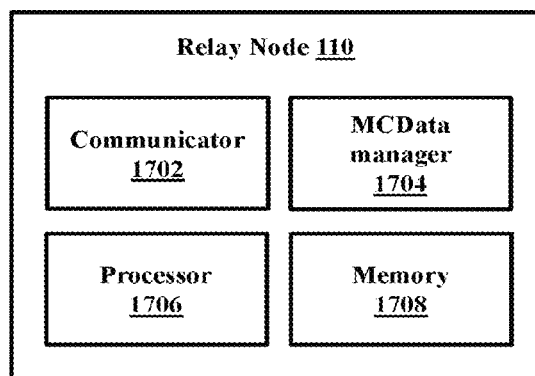

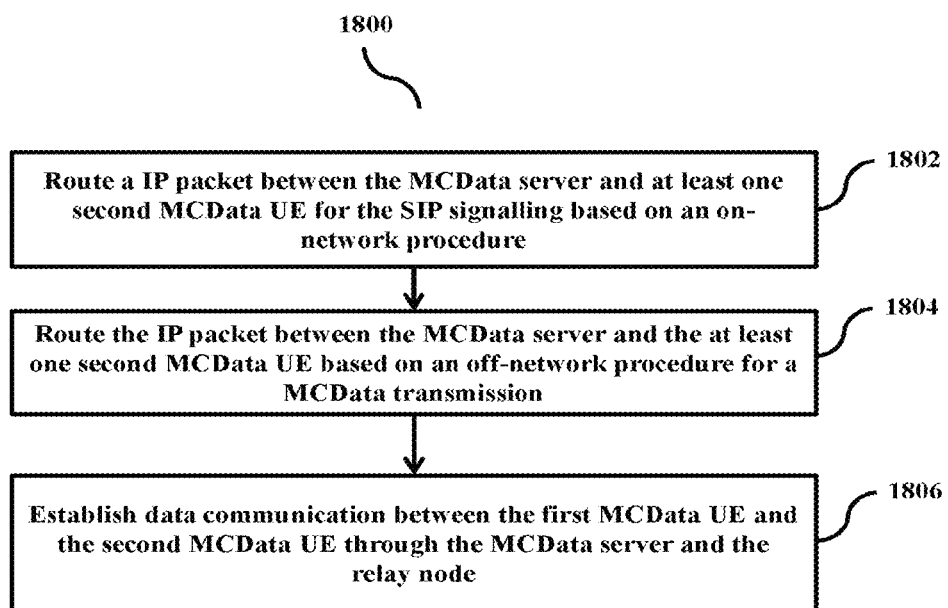
[Fig. 18]

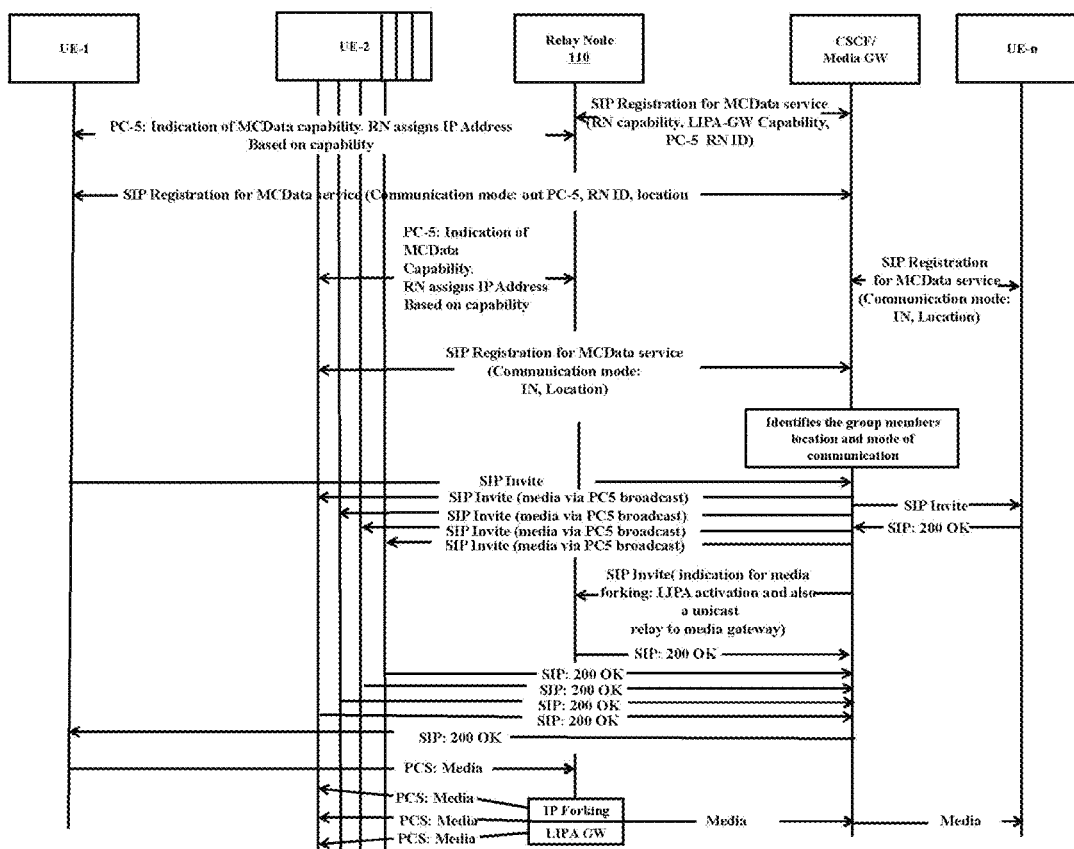
[Fig. 19]

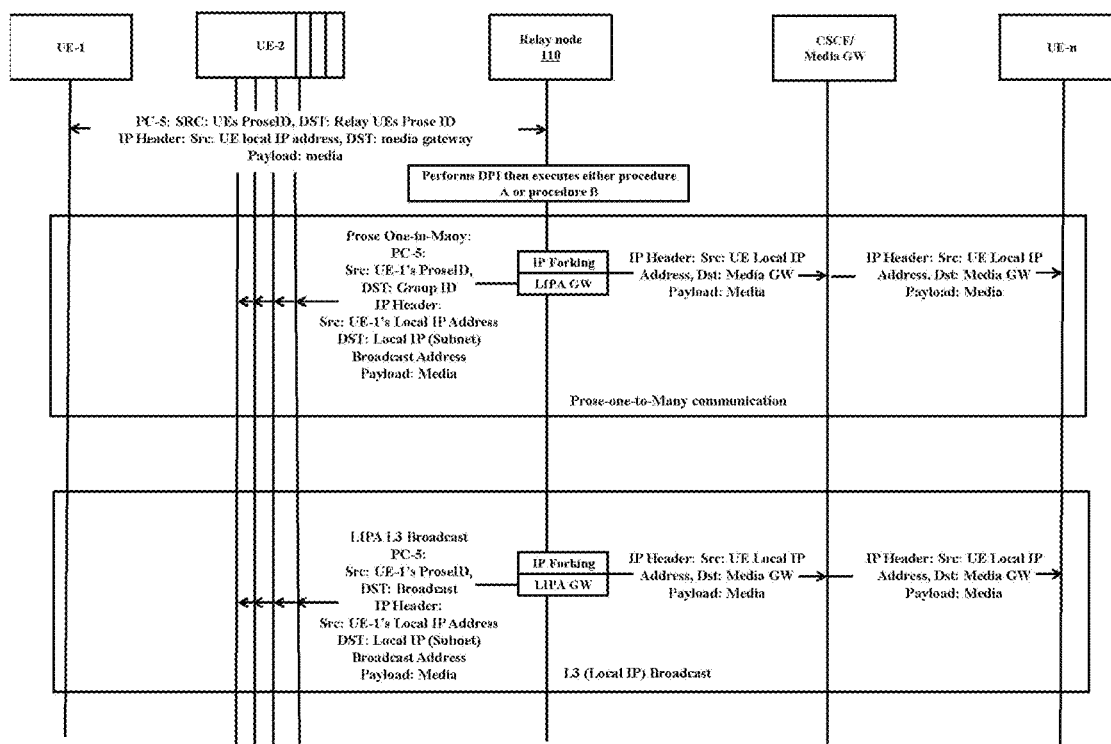

METHOD FOR MANAGING COMMUNICATION IN MISSION CRITICAL DATA (MCDATA) COMMUNICATION SYSTEM

CROSS-REFERENCE TO RELATED APPLICATIONS

This application is a continuation of U.S. patent application Ser. No. 16/334,710 filed on Mar. 19, 2019, which is a 371 of International Application No. PCT/KR2017/010264 filed on Sep. 19, 2017, which claims priority to India Patent Application No. 201641031911 filed on Sep. 19, 2016, India Patent Application No. 201641033346 filed on Sep. 29, 2016, and India Patent Application No. 201641031911 filed on Sep. 18, 2017, the disclosures of which are herein incorporated by reference in their entirety.

BACKGROUND

1. Field

The present disclosure relates to Mission Critical data (MCData) communication system and more particularly relates to a method for managing communication in a MCData communication system.

2. Description of the Related Art

Public safety networks are used for Mission Critical (MC) Data/Voice/Video communications. The MC communication may include defined set of MCData services. Such MCData services typically build on existing third generation partnership project (3GPP) transport communication mechanisms provided by the evolved packet system (EPS) architectures to establish, maintain, and terminate the actual communication path(s) among the users. Typically, a MCData server provides centralized support for such MCData services. The MCData server further can facilitate or govern MCData communication among various users part of the network.

In an alternate deployment, such MCData services can be off-network. In such deployments the MCData devices communicate directly with each other without the MCData server for centralized support for the service.

The MCData services are designed to provide one-to-one, one-to-many, and group communications between users. The public safety community is keen in the services beyond voice i.e., data and video applications. The MCData makes frequent use of a set of capabilities and enablers that allows for many end user services to be built on a common foundation. File Distribution (FD) and Data Streaming (DS) features are such capabilities for use in the MCData service. The file distribution and data streaming can be used on its own or in combination with other services, or may be used by other services to realize certain features such as sharing of standalone media files and application data. The FD and the DS functionalities may include one-to-one, or one-to-many or group communication. In addition, the FD and the DS services may offer the ability to provide thread management to allow for multiple communication flows. Hence an effective functional model and methods are necessary to support such FD and DS use cases and associated features.

Further, in the MC communication, a Relay node is employed to extend the network reachability/connectivity to a MCData UE operating out of network coverage (i.e., a Remote MCData UE). The Relay node acts as a layer-3 relay and forwards all the IP-packets received from the Remote MCData UE to the MC service and vice-versa. This allows Remote MCData UE to register to the MC service and avail on-network services.

The connection between the Remote MCData UE and the MC service via the Relay node is a one-to-one connection in the current implementation of the Remote MCData UE. One-to-one connection for a group call is an overhead (resource extensive) and is inefficient when multiple Remote MCData UEs of the same group are connected to the MC service via the same Relay node. Even though, there is a technical limit on the number of Remote MCData UEs that a Relay node can serve simultaneously, this one-to-one connection for a group communication further drastically reduces the number of Remote MCData UEs that a Relay node can serve.

The above information is presented as background information only to help the reader to understand the present invention. Applicants have made no determination and make no assertion as to whether any of the above might be applicable as Prior Art with regard to the present application.

SUMMARY

The principal object of the embodiments herein is to provide a method for managing communication in a Mission Critical (MC) Data communication system.

Another object of the embodiments herein is to provide an application plane functional model for file distribution.

Another object of the embodiments herein is to provide a method for managing one-to-one File Distribution (FD) in on-network data communication system using Hyper Text Transfer Protocol (HTTP).

Another object of the embodiments herein is to provide a method for managing one-to-one FD using media plane.

Another object of the embodiments herein is to provide a method for managing group standalone FD in the on-network data communication system using HTTP.

Another object of the embodiments herein is to provide a method for managing group standalone FD in the on-network data communication system using media plane.

Another object of the embodiments herein is to provide a method for managing data streaming (DS) to one or more MCData UEs.

Another object of the embodiments herein is to provide a method for optimizing radio resource utilization and backhaul link utilization in a combination of on-network and off-network MCData communication system.

Another object of the embodiments herein is to optimize radio resource utilization of the PC5 interface for the MCData service, when multiple group members are under a relay node.

Another object of the embodiments herein is to reduce the number of unicast transmissions between the media server and the UEs, by local routing at the relay node.

Accordingly the embodiments herein provide a method managing communication in a mission critical (MC) Data communication system. The method includes receiving, by a MCData server, a MCData request message from a first MCData UE from a plurality of MCData UE. The method includes transmitting, by the MCData server, the MCData request message to a second MCData UE from the plurality of MCData UE. The method includes receiving, by the MCData server, a MCData response message from the second MCData UE. The method includes transmitting, by the MCData server, the MCData response message to the first MCData UE. The first MCData UE from the plurality of MCData UE and the second MCData UE from the plurality of MCData UE are in one of an on-network data communication system and a combination of the on-network data communication system and an off-network data communication system.

Accordingly the embodiments herein provide a mission critical data (MCData) server for communication in a mission critical (MC) Data communication system. The MCData server includes a processor, memory coupled to the processor and a communicator coupled to the memory and the processor. The communicator configured to receive a MCData request message from a first MCData UE from a plurality of MCData UE. The communicator configured to transmit the MCData request message to a second MCData UE from the plurality of MCData UE. The communicator configured to receive a MCData response message from the second MCData UE. The communicator configured to transmit the MCData response message to the first MCData UE. The first MCData UE from the plurality of MCData UE and the second MCData UE from the plurality of MCData UE are in one of an on-network data communication system and a combination of the on-network data communication system and an off-network data communication system.

Accordingly the embodiments herein provide a relay node for managing communication in a mission critical (MC) Data communication system. The relay node includes a processor, memory coupled to the processor and a MCData manager, coupled to the memory and the processor. The MCData manager configured to route a IP packet between a MCData server and at least one MCData UE for a Session Initiation Protocol (SIP) signaling based on an on-network procedure. Further, the MCData manager configured to route the IP packet (media) between the MCData server and the at least one MCData UE based on an off-network procedure for a MCData transmission.

According to an embodiment of the present invention discloses a method for managing communication in a mission critical data (MCData) communication system, the method comprising: receiving, by a MCData server, a MCData request message from a first MCData UE from a plurality of MCData UE; transmitting, by the MCData server, the MCData request message to a second MCData UE from the plurality of MCData UE; receiving, by the MCData server, a MCData response message from the second MCData UE; and transmitting, by the MCData server, the MCData response message to the first MCData UE; and wherein the first MCData UE from the plurality of MCData UE and the second MCData UE from the plurality of MCData UE are in one of an on-network data communication system and a combination of the on-network data communication system and an off-network data communication system.

In an embodiment of the present invention, wherein the data communication between the first MCData UE and the second MCData UE is established through the MCData server, when the first MCData UE and the second MCData UE are in the on-network data communication system.

In an embodiment of the present invention, wherein the MCData server receives a MCData FD request message from the first MCData UE, wherein the MCData FD request message comprises receiving a MCData upload data request message using hypertext transfer protocol (HTTP) from the first MCData UE, wherein the MCData server transmits a MCData upload data response message to the first MCData UE in response to the receiving MCData upload data request message from the first MCData UE using HTTP.

In an embodiment of the present invention, wherein the MCData FD request message comprises at least one of a MCData ID of the first MCData UE, a MCData ID of the second MCData UE, a conversation identifier, a transaction identifier, download indication and content reference.

In an embodiment of the present invention, wherein the MCData server authorizes the first MCData UE for transmitting the MCData FD request message to the second MCData UE.

In an embodiment of the present invention, wherein the MCData server receives a MCData download request from the second MCData UE based on the download indication enabled in the MCData FD request message transmitted to the second MCData UE.

In an embodiment of the present invention, wherein the MCData server transmits a MCData download data response message to the second MCData UE using HTTP in response to receiving the MCData download data request message from the second MCData UE.

In an embodiment of the present invention, wherein the method further comprises: receiving, by the MCData server, a MCData download completed report message from the second MCData UE; and transmitting, by the MCData server, a MCData download completed report message to the second MCData UE.

In an embodiment of the present invention, wherein the MCData server transmits file data to the second MCData UE using an established media plane.

In an embodiment of the present invention, wherein the MCData server receives, a MCData group standalone FD request message from the first MCData UE for transmitting a file to a group of second MCData UEs.

In an embodiment of the present invention, wherein the MCData server identifies, a group identifier associated with the group of second MCData UEs, wherein the MCData server transmits a MCData group standalone FD request to the group of second MCData UEs.

In an embodiment of the present invention, wherein the MCData server receives a MCData group standalone FD response message from the group of second MCData UEs, wherein the MCData server transmits the MCData group standalone FD response to the first MCData UE.

In an embodiment of the present invention, wherein the method further comprises: transmitting, by the MCData server, a file to the group of second MCData UEs using established media plane; receiving, by the MCData server, a MCData download completed report message from each of the second MCData UEs; and transmitting, by the MCData server, a MCData download completed report message to the first MCData UE by aggregating the MCData download completed report message received from each of the second MCData UEs.

In an embodiment of the present invention, wherein the MCData server receives a MCData stream data start request message from the first MCData UE, wherein the MCData server transmits the MCData stream data start request message to one or more second MCData UEs.

In an embodiment of the present invention, wherein the method further comprises: receiving, by the MCData server, a MCData stream data response message from the one or more second MCData UEs; transmitting, by the MCData server, the MCData stream data response message to the first MCData UE; and controlling, by the MCData server, data streaming based on a request received from one of the first MCData UE and the one or more second MCData UEs.

In an embodiment of the present invention, wherein the MCData server receives a MCData stream data release request message from the first MCData UE for releasing MCData stream, wherein the MCData server transmits the MCData stream data release request message to the one or more second MCData UEs.

In an embodiment of the present invention, wherein the MCData server receives a MCData stream data release response message from the one or more second MCData UEs, wherein the MCData server transmits the MCData stream data release response message to the first MCData UE, wherein the MCData server transmits a MCData stream report request message to the first MCData UE by aggregating the MCData stream report received from the one or more MCData UEs.

In an embodiment of the present invention, wherein the MCData server receives a MCData stream data control request from the first MCData UE, wherein the MCData server transmits a MCData stream data request message to the one or more second MCData UEs, wherein the MCData server receives a MCData stream data response message from the one or more second MCData UEs and transmits a MCData stream data control response message to the first MCData UE.

In an embodiment of the present invention, wherein the MCData server controls data streaming based on a request received from one of the first MCData UE and the one or more second MCData UEs, wherein the MCData server transmits a MCData stream report request message to the first MCData UE by aggregating the MCData stream report received from the one or more MCData UEs.

In an embodiment of the present invention, wherein the data communication between the first MCData UE and the second MCData UE is established through the MCData server and a relay node, when the first MCData UE and the second MCData UE are in the combination of the on-network data communication system and the off-network data communication system.

In an embodiment of the present invention, wherein the data communication between the first MCData UE and the second MCData UE is established through the MCData server and the relay node by: routing a IP packet between the MCData server and at least one second MCData UE for a MCData Session Initiation Protocol (SIP) signaling based on an on-network procedure; and routing the IP packet between the MCData server and the at least one second MCData UE based on an off-network procedure for a data transmission.

In an embodiment of the present invention, wherein a radio resource utilization is managed in the MCData communication system based on routing of the IP packet between the MCData server and the second MCData UE for the MCData signaling based on the on-network procedure, and routing of the IP packet (media) between the MCData server and the at least one second MCData UE based on the off-network procedure.

In an embodiment of the present invention, wherein the on-network procedure is used for the MCData SIP signaling and the off-network procedure is used for data transmission signaling, when a MCData service is provided by the relay node.

In an embodiment of the present invention, wherein the relay node broadcasts the IP packet (media) to the second MCData UE over a PC5 interface based on at least one of layer 3 procedure and a Proximity Services (ProSe) layer 2 procedure.

In an embodiment of the present invention, wherein the on-network procedure corresponds to a unicast transmission used for the MCData SIP signaling.

In an embodiment of the present invention, wherein the unicast transmission is used for the MCData SIP signaling, by local routing at the Relay node, between the media server and the at least one second MCData UE.

In an embodiment of the present invention, wherein the off-network procedure corresponds to a broadcast transmission used for the data transmission.

In an embodiment of the present invention, wherein the IP packet is routed between the MCData server and the at least one second MCData UE based on the off-network procedure along with a local IP access procedure for the MCData data transmission.

According to an embodiment of the present invention discloses a mission critical data (MCData) server for communication in a mission critical (MC) Data communication system, the MCData server comprising: a processor; a memory coupled to the processor; and a communicator, coupled to the processor and the memory, configured to: receive a MCData request message from a first MCData UE from a plurality of MCData UE; transmit the MCData request message to a second MCData UE from the plurality of MCData UE; receive a MCData response message from the second MCData UE; and transmit the MCData response message to the first MCData UE; and wherein the first MCData UE from the plurality of MCData UE and the second MCData UE from the plurality of MCData UE are in one of an on-network data communication system and a combination of the on-network data communication system and an off-network data communication system.

In an embodiment of the present invention, wherein the data communication between the first MCData UE and the second MCData UE is established through the MCData server, when the first MCData UE and the second MCData UE are in the on-network data communication system.

In an embodiment of the present invention, wherein the communicator configured to receive receives a MCData FD request message from the first MCData UE, wherein the MCData FD request message comprises receiving a MCData upload data request message using hypertext transfer protocol (HTTP), wherein the MCData server transmits a MCData upload data response message to the first MCData UE in response to the receiving MCData upload data request message from the first MCData UE using HTTP.

In an embodiment of the present invention, wherein the MCData FD request message comprises at least one of a MCData ID of the first MCData UE, a MCData ID of the second MCData UE, a conversation identifier, a transaction identifier, download indication and content reference.

In an embodiment of the present invention, wherein the MCData server comprises a MCData manager configured to authorizes the first MCData UE for transmitting the MCData FD request message to the second MCData UE.

In an embodiment of the present invention, wherein the communicator configured to receives a MCData download request from the second MCData UE based on the download indication enabled in the MCData FD request message transmitted to the second MCData UE.

In an embodiment of the present invention, wherein the communicator configured to transmits a MCData download data response message to the second MCData UE using HTTP in response to receiving the MCData download data request message from the second MCData UE.

In an embodiment of the present invention, wherein the communicator further configured to: receive a MCData download completed report message from the second MCData UE; and transmit a MCData download completed report message to the second MCData UE.

In an embodiment of the present invention, wherein the communicator configured to transmit file data the second MCData UE using an established media plane.

In an embodiment of the present invention, wherein the communicator configured to receive a MCData group standalone FD request message from the first MCData UE for transmitting a file to a group of second MCData UEs;

In an embodiment of the present invention, wherein the MCData manager configured to identify a group identifier associated with the group of second MCData UEs, wherein the MCData server transmits a MCData group standalone FD request to the group of second MCData UEs.

In an embodiment of the present invention, wherein the communicator configured to receive a MCData group standalone FD response message from the group of second MCData UEs, wherein the MCData server transmits the MCData group standalone FD response to the first MCData UE.

In an embodiment of the present invention, wherein the communicator further configured to: transmit a file to the group of second MCData UEs using established media plane, receive a MCData download completed report message from each of the second MCData UEs; and transmit by the MCData server, a MCData download completed report message to the first MCData UE by aggregating the MCData download completed report message received from each of the second MCData UEs.

In an embodiment of the present invention, wherein the communicator configured to receive a MCData stream data start request message from the first MCData UE, wherein the MCData server transmits the MCData stream data start request message to one or more second MCData UEs.

In an embodiment of the present invention, wherein the communicator further configured to: receive a MCData stream data response message from the one or more second MCData UEs; transmit the MCData stream data response message to the first MCData UE; and control data streaming based on a request received from one of the first MCData UE and the one or more second MCData UEs.

In an embodiment of the present invention, wherein the communicator configured to receives a MCData stream data release request message from the first MCData UE for releasing MCData stream, wherein the MCData server transmits the MCData stream data release request message to the one or more second MCData UEs.

In an embodiment of the present invention, wherein the communicator configured to receive a MCData stream data release response message from the one or more second MCData UEs, wherein the communicator configured to transmit the MCData stream data release response message to the first MCData UE, wherein the communicator configured to transmit a MCData stream report request message to the first MCData UE by aggregating the MCData stream report received from the one or more MCData UEs.

In an embodiment of the present invention, wherein the communicator configured to receives a MCData stream data control request from the first MCData UE, wherein the communicator configured to transmit a MCData stream data request message to the one or more second MCData UEs, wherein the communicator configured to receive a MCData stream data response message from the one or more second MCData UEs and transmits a MCData stream data control response message to the first MCData UE.

In an embodiment of the present invention, wherein the MCData manager configured to control data streaming based on a request received from one of the first MCData UE and the one or more second MCData UEs, wherein the MCData server transmits a MCData stream report request message to the first MCData UE by aggregating the MCData stream report received from the one or more MCData UEs.

According to an embodiment of the present invention discloses a relay node for managing communication in a mission critical (MC) Data communication system, the relay node comprising: a memory; a processor; and a MCData manager, coupled to the memory and the processor, configured to: route a IP packet between a MCData server and at least one MCData UE for a Session Initiation Protocol (SIP) signaling based on an on-network procedure; and route the IP packet between the MCData server and the at least one MCData UE based on an off-network procedure for a MCData transmission.

In an embodiment of the present invention, wherein a radio resource utilization is managed in the MCData communication system based on routing of the IP packet between the MCData server and the at least one MCData UE for the signaling based on the on-network procedure, and routing of the IP packet (media) between the MCData server and the at least one MCData UE based on the off-network procedure.

In an embodiment of the present invention, wherein the on-network procedure is used for the SIP signaling and the off-network procedure is used for MCData transmission signaling, when a MC service is provided by the relay node.

In an embodiment of the present invention, wherein the relay node broadcasts the IP packet (media) to the MCData UE over a PC5 interface based on at least one of layer 3 procedure and a Proximity Services (ProSe) layer 2 procedure.

In an embodiment of the present invention, wherein the on-network procedure corresponds to a unicast transmission used for the SIP signaling.

In an embodiment of the present invention, wherein the unicast transmission is used for the SIP signaling, by local routing at the relay node, between the media server and the at least one MCData UE.

In an embodiment of the present invention, wherein the off-network procedure corresponds to a broadcast transmission used for the MCData transmission.

In an embodiment of the present invention, wherein the IP packet (media) is routed between the MCData server and the at least one MCData UE based on the off-network procedure along with a local IP access procedure for the MCData transmission.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIGS. 1A and 1B illustrate an example on-network MCData communication systems for managing data communication, according to an embodiment as disclosed herein;

FIG. 1C illustrates an example MCData communication system managing data communication between a first MCData UE and a second MCData UE through a MCData server and a relay node, according to an embodiment as disclosed herein;

FIG. 2 illustrates an application plane functional model for FD, according to embodiments as disclosed herein;

FIG. 3 illustrates a functional model for the application plane for a MCData UE data streaming, according to embodiments as disclosed herein;

FIG. 4 illustrates a functional model for the application plane for data streaming, according to embodiments as disclosed herein;

FIG. 5 illustrates a functional model for a signaling control plane, according to embodiments as disclosed herein;

FIG. 6 is a block diagram illustrating various hardware components of the MCData Server, according to an embodiment as disclosed herein;

FIG. 7 is a flow diagram illustrating a method for managing communication in the MCData communication system, according to an embodiment as disclosed herein;

FIG. 8 is a sequence diagram illustrating various signaling messages for file upload using Hyper Text Transfer Protocol (HTTP), according to an embodiment as disclosed herein;

FIG. 9 is a sequence diagram illustrating various signaling messages for file download using HTTP, according to an embodiment as disclosed herein;

FIG. 10 is a sequence diagram illustrating various signaling messages communicated between a first MCData UE, the MCData server and a second MCData UE for one-to-one FD using HTTP, according to an embodiment as disclosed herein;

FIG. 11 is a sequence illustrating various signaling messages communicated between the first MCData UE, the MCData server and the second MCData UE for one-to-one FD using media plane, according to an embodiment as disclosed herein;

FIG. 12 is a sequence diagram illustrating various signaling messages communicated between the first MCData UE, the MCData server and a group of second MCData UEs for group standalone FD using HTTP, according to an embodiment as disclosed herein;

FIG. 13 is a sequence diagram illustrating various signaling messages communicated between the first MCData UE, the MCData server and the group of second MCData UEs for group standalone FD using media plane, according to an embodiment as disclosed herein;

FIG. 14 is a flow diagram illustrating a method for managing Data Streaming (DS) in MCData communication system, according to an embodiment as disclosed herein;

FIG. 15A-15B is a sequence diagram illustrating various signaling messages where the first MCData UE is initiating a data communication for streaming content to second MCData UE(s) with or without stream report request, according to embodiments as disclosed herein, FIG. 15B is a sequential view of FIG. 15A;

FIG. 16A-16B is a sequence diagram illustrating various signaling messages in which the first MCData UE initiates a data communication for streaming content to the second MCData UE(s), with or without stream report request, according to embodiments as disclosed herein, FIG. 16B is a sequential view of FIG. 16A;

FIG. 17 is a block diagram illustrating various hardware components of the relay node, according to an embodiment as disclosed herein;

FIG. 18 is a flow diagram illustrating a method for managing the data communication between the first MCData UE and the second MCData UE through the MCData server and the relay node, according to an embodiment as disclosed herein;

FIG. 19 is a sequence diagram illustrating various signaling messages for managing data communication between the first MCData UE and the second MCData UE through the MCData server and the relay node, according to an embodiment as disclosed herein; and FIG. 20 is a sequence diagram illustrating broadcast mechanisms, according to an embodiment as disclosed herein.

DETAILED DESCRIPTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The term "first" and "second" herein are used merely for labeling purpose and can be used interchangeably without departing from the scope of the embodiments.

Accordingly the embodiments herein provide a method managing communication in a mission critical data (MCData) communication system. The method includes receiving, by a MCData server, a MCData request message from a first MCData UE from a plurality of MCData UE. The method includes transmitting, by the MCData server, the MCData request message to a second MCData UE from the plurality of MCData UE. The method includes receiving, by the MCData server, a MCData response message from the second MCData UE. The method includes transmitting, by the MCData server, the MCData response message to the first MCData UE. The first MCData UE from the plurality of MCData UE and the second MCData UE from the plurality of MCData UE are in one of an on-network data communication system and a combination of the on-network data communication system and an off-network data communication system.

The embodiments herein achieve a system and method for managing a FD and DS in a mission critical service. In an embodiment, the proposed method provides a functional model and mechanisms to support mission critical data services. The functional model to support file distribution and data streaming, and associated procedures including one-to-one, one-to-many, and group data communications.

The proposed method provides a functional model to support mission critical FD and DS features. The proposed method describes reference points between functional entities, and functionality supported by these reference points to enable the interaction between the entities.

In an embodiment, when the first MCData UE 102a and the second MCData UE 102b are the on-network data communication system, the proposed method and system provides mechanisms for FD and DS between the first MCData UE 102a and the one or more second MCData UE(s) 102b-102n.

In another embodiment, when the first MCData UE 102a and the second MCData UE 102b are in combination of the on-network data communication system and an off-network data communication system, the proposed method and system can be used to efficiently utilize the resources using the on-network procedure (i.e., unicast procedure) for the SIP signaling and an off-network procedure (e.g., broadcast/multicast procedure (i.e., one-to-many procedure)) for the MCData transmission, when the MC service is provided by relay node (i.e., UE-network relay node).

The proposed method and system can be used to reduce the number of unicast transmission by the MCData server to the MCData UE(s), by local routing at the relay node.

The proposed method can be used to reduce routing of the media streams within the relay node effectively. The proposed method can be used to switch from multiple unicast transmissions to a broadcast transmission based on location of the relay node.

Referring now to the drawings, and more particularly to FIGS. 1 through 20, where similar reference characters denote corresponding features consistently throughout the figures, there are shown preferred embodiments.

FIGS. 1A and 1B illustrate example on-network MCData communication systems for managing communication, according to an embodiment as disclosed herein.

Prior to describing the embodiments in detail, the MCData communication system is described herein briefly. In general, as shown in FIGS. 1A and 1B, a MCData communication system 100 includes a first MCData UE 102a, a group of second MCData UEs 102b-102n and a MCData server 104 in a network 106. The MCData server 104 serves as a centralized server to enable the network 106 to provide MCData service to MCData UEs 102a-102n.

In some examples, the network 106 includes 3GPP E-UTRAN access elements (not shown) and 3GPP E-UTRAN core elements (not shown). For example, the first MCData UE 102a gains access to the network 106 through a LTE-Uu interface (not shown) or through an evolved Node B (eNB, not shown). Further, the MCData server 104 may couple to various access/core elements of the network 106. For example, the MCData server 104 can couple to a serving gateway/packet data gateway through one or more suitable interface reference points. Various core elements such as mobile management entity (MME) and multimedia broadcast/multicast service gateway (MBMS GW) may provide core 3GPP E-UTRAN services to the MCData server 104 and/or the MCData UEs 102a-102n, to facilitate MCData communication services by the network 106.

In an embodiment, the MCData UEs 102a-102n can be for e.g., an electronic device, a User Equipment (UE), or the like. Each of the MCData UEs 102a-102n can include a MCData client (i.e., an application) for communicating with the MCData server 104. The first MCData UE 102a includes a first MCData client; the second MCData UE 102b includes a second MCData client and so on.

The MCData client residing at each of the MCData UEs 102a-102n, acts as user agent for all the MCData application transactions. The MCData client supports file distribution, data streaming and IP connectivity and MCData capabilities utilized by MCData services like conversation management, robots control, enhanced status, database enquiries and secured internet.

The MCData server 104 provides centralized support for MCData services suite. Conversation management, robots, enhanced status, database enquiries and secured internet MCData services requiring one-to-one data or group communication are realized using short data service (SDS), file distribution (FD), data streaming (DS) and Internet Protocol (IP) connectivity MCData communication capabilities. All the MCData clients supporting users belonging to a single group are required to use the same MCData server 104 for that group. In one embodiment, HTTP is used as communication transport means for MCData communication.

Now Referring to FIG. 1A, the MCData communication system 100 includes the first MCData UE 102a, the MCData server 104 in the network 106 and the second MCData UE 102b. The MCData server 104 facilitates/provides one-to-one FD between the first MCData UE 102a and the second MCData UE 102b through the network 106 using HTTP.

In an embodiment, the MCData server 104 facilitates/provides one-to-one FD between the first MCData UE 102a and the second MCData UE 102b through the network 106 using media plane.

Referring to FIG. 1B, the MCData communication system 100 includes the first MCData UE 102a, the MCData server 104 in the network 106 and the group of second MCData UEs 102b-102n. The MCData server 104 provides group standalone FD between the first MCData UE 102a and the group of second MCData UEs 102b-102n using HTTP.

In an embodiment, the MCData server 104 facilitates/provides group standalone FD between the first MCData UE 102a and the group of second MCData UEs 102b-102n through the network 106 using the media plane.

In some embodiments, the MCData server 104 facilitates/provides data communication for streaming content to one or more second MCData UE(s) 102b-102n, where the streaming content is present at the first MCData UE 102a.

In some embodiments, the MCData server 104 facilitates/provides data communication for streaming content to one or more second MCData UE(s) 102b-102n, where the streaming content is present at the MCData server 104.

FIG. 1C illustrates an example MCData communication system 200 managing data communication between a first MCData UE 102a and a second MCData UE 102b through a MCData server 104 and a relay node 110, according to an embodiment as disclosed herein.

Referring to the FIG. 1C, the data communication between the first MCData UE 102a and the second MCData UE 102b is established through the MCData server 104 and the relay node 110, when the first MCData UE 102a and the second MCData UE 102b are in the combination of the on-network data communication system and the off-network data communication system 200 as shown in the FIG. 1C.

In an embodiment, the data communication between the first MCData UE 102a and the second MCData UE 102b is established through the MCData server 104 and the relay node 110 by routing the IP packet between the MCData server 104 and at least one second MCData UE 102b for the MCData SIP signaling based on the on-network procedure, and routing the IP packet (media) between the MCData server and the at least one second MCData UE 102b based on an off-network procedure for the data transmission.

In an embodiment, a radio resource utilization is managed in the MCData communication system based on routing of the IP packet between the MCData server 104 and the second MCData UE 102b for the signaling based on the on-network procedure, and routing of the IP packet (media) between the MCData server 104 and the at least one second MCData UE 102b based on the off-network procedure.

In an embodiment, the on-network procedure is used for the MCData SIP signaling and the off-network procedure is used for data transmission, when the MC service is provided by the relay node 110.

In an embodiment, the relay node 110 broadcasts the IP packet (media) to the second MCData UE 102b over the PC5 interface based on a layer 3 procedure.

In an embodiment, the relay node 110 broadcasts the IP packet (media) to the second MCData UE 102b over the PC5 interface based on a Proximity Services (ProSe) layer 2 procedure.

In an embodiment, the on-network procedure corresponds to the unicast transmission used for the SIP signaling.

In an embodiment, the unicast transmission is used for the SIP signaling, by local routing at the relay node, between the media server and the at least one second MCData UE.

In an embodiment, the off-network procedure corresponds to the broadcast transmission used for the off-network communication.

In an embodiment, the IP packet (media) is routed between the MCData server and the at least one second MCData UE 102b based on the off-network procedure along with a local IP access procedure for the MCData transmission.

The use of the relay node 110 for MCData communication, as described in these embodiments, is not limited to the MCData communication. The relay node can be used to effectively utilize the radio resource in other communication systems also, such as but not limited to, Mission Critical Push To Talk (MCPTT) and Mission Critical Video (MCVideo) communication or the like.

FIG. 2 illustrates an application plane functional model for FD, according to embodiments as disclosed herein.

In an embodiment, the proposed method and system provides the application plane functional model to support mission critical FD and DS features. The proposed method and system describes reference points between functional entities, and functionality supported by these reference points to enable the interaction between the entities.

The on-network functional model for the FD is as detailed below. The functional model for an application plane is shown in the FIG. 2. In the model shown in the FIG. 2, the various reference points to enable the interaction between the entities are as detailed below.

MCData-FD-1 reference point is used for MCData application signaling for establishing a session in support of MCData file distribution. The bearer is also used for both uplink and downlink unicast data (e.g., URL associated to file, file download completed report).

MCData-FD-2 reference point carries uplink and downlink unicast file data between the FD functions of the MCData server and the first MCData UE 102a.

MCData-FD-3 reference point carries downlink multicast file data from the FD function of the MCData server to the FD function of the first MCData UE 102a.

MCData-FD-4 reference point carries uplink and downlink unicast file data between the media storage function of the MCData server and the media storage client of the MCData UE.

Common services core: The common services core on the MCData system provides the MCData supporting functions like configuration management, group management, identity management, key management. The common services core interacts with the other MCData functional entities such as CSC client, MCData server, MCData user database for providing the supporting functions.

MCData client functional entity: The MCData client functional entity acts as a user agent for all MCData application transactions. The client supports SDS, file distribution, data streaming and IP connectivity MCData capabilities for conversation management, robots control, enhanced status, database enquiries and secured internet MCData services.

The MCData client functional entity also acts of media storage client for the FD and the DS. Additionally, the MCData client acts as media player for playback of received streaming media in the DS and media controls for up streaming media in the DS.

Further, the FD function within the MCData client is responsible for sending and receiving requests over the reference points MCData-FD-1, MCData-FD-2, MCData-FD-3, subject to procedures used for one to one, one to many, and group communications. The FD client may be located in the MCData UE or any other forms of a physical device include unmanned devices such as robots, drones, remote cameras, etc. In addition FD function (client) may also interact with a media storage client that maybe collocated on the same device.

MCData server functional entity: The MCData server functional entity provides the centralized support for the MCData services suite. Conversation management, robots, enhanced status, database enquiries and secured internet MCData services requiring one-to-one or group data communication are realized using the SDS, file distribution, data streaming and IP connectivity MCData communication capabilities.

All the MCData clients supporting users belonging to a single group are required to use the same MCData server for that group. The MCData client supporting the user involved in multiple groups can have relationships with multiple MCData servers.

Further, the MCData server functional entity represents a specific instantiation of the GCS AS described in standard (i.e., 3GPP TS 23.468 [x]) to control multicast and unicast operations for the group communications.

Further, the MCData server functional entity is supported by the SIP AS functional entity of the signalling control plane.

By assuming the role of a GCS AS, the MCData server functional entity is responsible for:
- keeping track of the MCData UE location with respect to multicast service availability;
- requesting the allocation of multicast resources utilizing the media distribution function;
- announcing the association of multicast resources to data communication to MCData UEs;
- determining for each MCData UE involved in a given data communication whether to use unicast or multicast transport;
- announcing the assignment of multicast transport for specific data communication to MCData UEs; and
- informing the media distribution function of the media streams requiring support for a given data communication.

Further, the MCData server 104 shall support the controlling role and the participating role. The MCData server 104 may perform the controlling role for one-to-one and group data communication. The MCData server performing the controlling role for a one-to-one or group data communication may also perform a participating role for the same one-to-one or group data communication. For each one-to-one and group data communication, there shall be only one MCData server 104 assuming the controlling role, while one or more MCData servers 104 in participating role may be involved.

Further, the MCData server 104 performing the controlling role is responsible for:
- Data communication control (e.g. policy enforcement for participation in the MCData group data communication) towards all the MCData users of the group data communication and private data communication;
- Interfacing with a Group Management Server (GMS) for group policy and affiliation status information of this MCData server's served affiliated users; and
- Managing media handling entity in data communication.

Further, the MCData server 104 performing the participating role is responsible for:
- Data communication control (e.g. authorization for participation in the MCData group data communication) to its MCData users for group data communication and private data communication;
- Group affiliation support for MCData user, including enforcement of maximum number of simultaneous group affiliations by a user;
- Relaying the group data communication and private data communication control messages between the MCData client and the MCData server performing the controlling role; and
- Interfacing with the group management server for group policy and affiliation status information of this MCData server's served affiliated users;
- Handling reception control (e.g. temporarily storing the data to present to the MCData user on demand) to its MCData users of the one-to-one and group data communication;
- Media handling in group data communication and private data communication for its MCData users, i.e. for both unicast and multicast media.

Reference point MCData-FD-2 (unicast between the media distribution function and the media mixer)

Reference point MCData-FD-2 for FD: The MCData-FD-2 reference point, which exists between the media distribution function and the FD function, is used to exchange unicast media between the media distribution function of the MCData server and the FD function of the MCData client. The MCData-FD-2 reference point uses the SGi reference point defined in the 3GPP TS 23.002.

Similar to MCData-FD-1 reference point, MCData-FD-2 may also support the following functions. This may be particularly necessary when the file distribution media size exceeds the capabilities provided by MCData-FD-1.
- URL of the file being distributed;
- file being distributed which may contain application data (health parameters of MCData user for situational awareness application, information pertaining to enhanced status service etc.,) from and to the MCData user;
- conversation identifier for message thread indication; and
- application plane identities for the MCData user and MCData application.

FIG. 3 illustrates a functional model for the application plane for a MCData UE data streaming, according to embodiments as disclosed herein.

Media distribution function: The media distribution function is responsible for the distribution of media to the data communication participants. By means of information provided by the MCData server (e.g. IP addresses, transport layer ports), it will provide the following functionality:
- provide for the reception of uplink MCData UE media transmission by means of the MCData-FD-2 or UDS-MCData-7 or NDS-MCData-7 reference points for file distribution, UE Data streaming and network data streaming respectively;
- replicate the media as needed for distribution to those participants using unicast transport;
- distribute downlink media to MCData UEs by IP unicast transmission to those participants utilizing unicast transport by means of the MCData-FD-2 or UDS-MCData-7 or NDS-MCData-7 reference points for file distribution, UE Data streaming and network data streaming respectively;
- distribute downlink media to MCData UEs using multicast downlink transport of media for data communication by means of the MCData-FD-3 or UDS-MCData-8 or NDS-MCData-8 reference points for file distribution, UE Data streaming and network data streaming respectively; and
- provide a media mixing function where multiple media streams are combined into a single media stream for transmission to the MCData UE.

Media storage function: The media storage function is responsible for the storing of media uploaded by the MCData UE in case of FD and DS. It also supports download of stored media by the MCData UE in case of FD. The media storage function may be associated with a content server/database for storing the media persistently.

Transmission/Reception control: This functional entity is responsible for transmission and reception control of MCData between the sending MCData UE, the MCData server, and the receiving MCData. Transmission and reception control function is used to provide arbitration between multiple data requests and apply the necessary policy to ensure that appropriate data is transmitted between the MCData UE. However, when the data requests are exceeding a certain size such as large blogs of data, files or streams, it may be necessary to control the data that is transmitted or received by the MCData UEs. The control can be subject to various criteria including but not limited to application level priorities (e.g. user priority, group priority), service type, emergency nature of the communication, etc.

MCData user database: This functional entity contains information of the MCData user profile associated with the MCData ID that is held by the MCData service provider at the application plane. The MCData user profile is determined by the mission critical organization, the MCData service provider, and potentially the MCData user.

On-network functional model for the UE Data streaming:
UDS-MCData-1 reference point is used for the unicast media by the DS function between the MCData server and the MCData client and as well as for the MCData application signalling for establishing a session in support of the MCData UE data streaming. The bearer may be used for both uplink and downlink unicast media (stream records).

UDS-MCData-7 reference point carries the unicast media between the media distribution function of the MCData server and the media player and streaming function of the MCData UE. The bearer is used for both uplink and downlink unicast streaming media.

UDS-MCData-8 reference point carries the multicast media from the media distribution function of the MCData server to the media player and streaming function of the MCData UE. The bearer is used for downlink multicast streaming media.

The reference points for the application plane are described in the following subclauses.

Reference point MCData-1 (between the MCData client and the MCData server)

Reference point UDS-MCData-1 for UE DS: The UDS-MCData-1 reference point, which exists between the MCData client and the MCData server, is used for unicast media by the DS function between MCData server and MCData client and also for MCData application signalling for establishing a session in support of MCData UE data streaming. The UDS-MCData-1 reference point shall use the SIP-1 and SIP-2 reference points for transport and routing of SIP signalling. UDS-MCData-1 reference point can be used for unicast media as long as the media size does not exceed the capabilities provided by UDS-MCData-1.

Further, the messages supported on this interface may also include the uplink and the downlink unicast media between the MCData clients in one-to-one and one-to-many data communication via the MCData server for
 metadata (file size, type etc.) of the file being streamed;
 URL of the file being streamed;
 sending stream report;
 conversation identifier for message thread indication; and
 application plane identities for the MCData user and MCData application.

Further, the messages supported on this interface may also include the MCData client providing the MCData server with
 MCData application signalling for establishing a UE data streaming session in support of one-to-one, one-to-many and group MCData communication.

Further, the reference point UDS-MCData-1 may also provide the MCData server with location information with respect to multicast service availability for the MCData client. The TMGI is communicated between the MCData server and the MCData client using the UDS-MCData-1 reference point.

Reference point UDS-MCData-7 for UE DS: The UDS-MCData-7 reference point, which exists between the media distribution function and the DS function, is used to exchange unicast UE stream media between the media distribution function of the MCData server and the DS function of the MCData client. The UDS-MCData-7 reference point uses the SGi reference point defined in 3GPP TS 23.002 [3].

Similar to UDS-MCData-1 reference point, UDS-MCData-7 may also support the following functions. This may be particularly necessary when the file distribution media size exceeds the capabilities provided by UDS-MCData-1.
 stream data from MCData UE;
 stream playback controls from the MCData UE over uplink;
 start and stop stream from MCData UE over downlink;
 conversation identifier for message thread indication; and
 application plane identities for the MCData user and MCData application.

FIG. 4 illustrates a functional model for the application plane for a network data streaming, according to embodiments as disclosed herein. FIG. 4 shows the functional model for the application plane. In the model shown in the FIG. 4, the following are applicable:
 NDS-MCData-1 reference point is used for the unicast media by the DS function between the MCData server and the MCData client and as well as for the MCData application signalling for establishing a session in support of the MCData server data streaming. The bearer is used for both uplink and downlink unicast media (stream records).
 NDS-MCData-7 reference point carries the unicast media between the media distribution function of the MCData server and the media player of the MCData UE. The bearer is used for both uplink and downlink unicast streaming media.
 NDS-MCData-8 reference point carries the multicast media from the media distribution function of the MCData server to the media player of the MCData UE. The bearer is used for downlink multicast streaming media.
 NDS-MCData-10 reference point carries the unicast media between the media storage function of the MCData server and the media storage client of the MCData UE. The bearer is used for uplink streaming media.

Reference point NDS-MCData-1 for Network DS: The NDS-MCData-1 reference point, which exists between the MCData client and the MCData server, is used for unicast media by the DS function between MCData server and MCData client and also for MCData application signalling for establishing a session in support of MCData network data streaming. The NDS-MCData-1 reference point shall use the SIP-1 and SIP-2 reference points for transport and routing of SIP signalling. NDS-MCData-1 reference point can be used for unicast media as long as the media size does not exceed the capabilities provided by NDS-MCData-1.

Further, the messages supported on this interface may also include the uplink and the downlink unicast media between the MCData clients in one-to-one and one-to-many data communication via the MCData server for
 metadata (file size, type etc.) of the file being streamed;
 URL of the file being streamed;
 sending stream report;

conversation identifier for message thread indication; and
application plane identities for the MCData user and MCData application.

Messages supported on this interface may also include the MCData client providing the MCData server with MCData application signalling for establishing a network data streaming session in support of one-to-one, one-to-many and group MCData communication.

Further, the reference point NDS-MCData-1 may also provide the MCData server with location information with respect to the multicast service availability for the MCData client. The TMGI is communicated between the MCData server and the MCData client using the NDS-MCData-1 reference point.

Reference point NDS-MCData-7 for Network DS: The NDS-MCData-7 reference point, which exists between the media distribution function and the DS function, is used to exchange unicast network stream media between the media distribution function of the MCData server and the DS function of the MCData client. The NDS-MCData-7 reference point uses the SGi reference point defined in 3GPP TS 23.002.

Similar to NDS-MCData-1 reference point, NDS-MCData-7 may also support the following functions. This may be particularly necessary when the file distribution media size exceeds the capabilities provided by NDS-MCData-1.
  stream data from network;
  stream playback controls from the authorized MCData UE;
  start and stop stream from the stream receiving MCData UE;
  conversation identifier for message thread indication; and
  application plane identities for the MCData user and MCData application.

Reference point MCData-2 (between the MCData server and the MCData user database): The MCData-2 reference point, which exists between the MCData server and the MCData user database, is used by the MCData server 104 to obtain information about a specific user. The MCData-2 reference point utilizes a diameter management application protocol as defined in 3GPP TS 29.283 and shall be intra-network.

Reference point MCData-3 (between the MCData server and the MCData server): The MCData-3 reference point, which exists between the MCData server and the MCData server for unicast media by the SDS function and MCData application signalling for establishing MCData sessions, shall use the SIP-2 reference point for transport and routing of signalling. If each MCData server 104 is served by a different SIP core then the MCData-3 reference point shall also use the SIP-3 reference point for transport and routing of signalling.

FIG. 5 illustrates a functional model for a signalling control plane, according to embodiments as disclosed herein.

Signalling user agent: This functional entity acts as the SIP user agent (both client and server) for all SIP transactions SIP AS: The SIP AS functional entity supports the following functions on behalf of the MCData service:
  influencing and impacts the SIP session;
  In an embodiment, In the IM CN subsystem, this is provided by the application server as defined in the 3GPP TS 23.002.

SIP core: The SIP core contains a number of sub-entities responsible for registration, service selection and routing in the signalling control plane.

The SIP core shall be either:
  compliant with 3GPP TS 23.228, i.e. the SIP core is a 3GPP IP multimedia core network subsystem; or
  a SIP core, which internally need not comply with the architecture of 3GPP TS 23.228, but with the reference points that are defined in subclause 7.5.3 (if exposed), compliant to the reference points defined in 3GPP TS 23.002.

The data related to the functions of the SIP core, e.g. for data for application service selection, the identity of the serving registrar or authentication related information may be provided by the PLMN operator responsible for the bearer plane. In this case, the SIP database that is the source of the data may be part of the HSS. Alternatively, this data may be provided by the MCData service provider. In this case, the source of the data may be the MCData service provider's SIP database.

HTTP client: This functional entity acts as the client for all hypertext transactions.

HTTP server: This functional entity acts as the HTTP server for all hypertext transactions.

Reference point UDS-MCData-8 for UE DS: The UDS-MCData-8 reference point, which exists between the media distribution function and the DS function, is used by the media distribution function of the MCData server to send multicast UE media to the DS function of the MCData client. The UDS-MCData-8 reference point uses the MB2-U interface defined in 3GPP TS 23.468.

Reference point NDS-MCData-8 for Network DS: The NDS-MCData-8 reference point, which exists between the media distribution function and the DS function, is used by the media distribution function of the MCData server to send multicast network media to the DS function of the MCData client. The NDS-MCData-8 reference point uses the MB2-U interface defined in 3GPP TS 23.468.

Reference point MCData-FD-4 (media storage function and media storage client)

Reference point MCData-FD-4 for FD: The FD-MCData-10 reference point, which exists between the media storage function and the media storage client, is used by the media storage client of MCData UE to upload and download file to the media storage function of the MCData server. The MCData-FD-10 reference point uses the HTTP-1 reference point.

Reference point NDS-MCData-10 for Network DS: The NDS-MCData-10 reference point, which exists between the media storage function and the media storage client, is used by the media storage client of MCData UE to upload stream to the media storage function of the MCData server. The NDS-MCData-10 reference point uses the HTTP-1 reference point.

The reference points for the SIP and other signalling are described in the following subclauses.

Reference point SIP-1 (between the signalling user agent and the SIP core)

The SIP-1 reference point, which exists between the signalling user agent and the SIP core for establishing a session in support of MCData, shall use the Gm reference point as defined in 3GPP TS 23.002 [3] (with necessary enhancements to support MCData requirements and profiled to meet the minimum requirements for support of MCData). The SIP-1 reference point fulfils the requirements of the GC1 reference point specified in 3GPP TS 23.468. The SIP-1 reference point is used for:
  SIP registration;
  authentication and security to the service layer;
  MCData user or application data;

disposition request and notification;

communication of the TMGI for multicast operation; and session management and media negotiation.

Reference point SIP-2 (between the SIP core and the SIP AS): The SIP-2 reference point, which exists between the SIP core and the SIP AS for establishing a session in support of MCData, shall use the ISC and Ma reference points as defined in 3GPP TS 23.002 [3]. The SIP-2 reference point is used for:

notification to the MCData server of SIP registration by the MCData UE;

authentication and security to the service layer;

MCData user or application data;

disposition request and notification;

communication of the TMGI for multicast operation; and session management and media negotiation.

Reference point SIP-3 (between the SIP core and SIP core): The SIP-3 reference point, which exists between one SIP core and another SIP core for establishing a session in support of MCData, shall use the Mm and ICi reference points as defined in 3GPP TS 23.002 The SIP-3 reference point is used for:

MCData user or application data;

disposition request and notification; and session management and media negotiation.

Reference point AAA-1 (between the SIP database and the SIP core): The AAA-1 reference point, which exists between the SIP database and the SIP core, is used by the SIP core to retrieve signalling plane data from the SIP database. The AAA-1 reference point utilizes the Cx reference point as defined in 3GPP TS 23.002

In some deployment scenarios the registrar and SIP database are located in the MCData service provider's network while the registrar finder is in the PLMN operator's network and the AAA-1 reference point is an inter-network interface.

Reference point HTTP-1 (between the HTTP client and the HTTP server): The HTTP-1 reference point exists between the HTTP client and the HTTP server (may be via proxy). The HTTP-1 reference point is based on HTTP (which may be secured using e.g. SSL, TLS).

FIG. 6 is a block diagram illustrating various hardware components of the MCData Server 104, according to an embodiment as disclosed herein. The MCData server 104 includes a communicator 602, a MCData manager 604, a processor 606 and a memory 608.

In an embodiment, the communicator 602 can be configured to receive the MCData request message from the first MCData UE 102a and transmit the MCData request message to the second MCData UE 102b in case of one-to-one MCData communication. Further, the communicator 602 can also be configured to receive a MCData response message from the second MCData UE 102b. Furthermore, the communicator 602 can be configured to transmit the MCData response message to the first MCData UE 102a.

In another embodiment, the communicator 602 can be configured to receive a MCData FD request message from the first MCData UE 102a. In an embodiment, the communicator 602 configured to receive a MCData upload data request message using HTTP. Further, the communicator can be configured to transmit a MCData upload data response message to the first MCData UE 102a in response to the receiving MCData upload data request message from the first MCData UE using HTTP.

In an embodiment, the communicator 602 can be configured to receive a MCData download request from the second MCData UE 102b based on the download indication enabled in the MCData FD request message transmitted to the second MCData UE 102b.

In an embodiment, the communicator 602 can be configured to receive a MCData download completed report message from each of the second MCData UEs 102b-102n. Further, the communicator 602 can be configured to transmit the MCData download completed report message to the first MCData UE 102a.

In some embodiments, the communicator 602 can be configured to receive a MCData stream data start request message from the first MCData UE 102a. Further, the communicator 602 can be configured to transmit the MCData stream data start request message to one or more second MCData UEs 102b-102n. In some embodiments, the communicator 602 can be configured to transmit/receive one or more signaling messages for data streaming (as described in the FIGS. 15 and 16) between the first MCData UE and the second MCData UEs 102b-102n.

In an embodiment, the MCData manager 604 can be configured to authorize the MCData UEs 102a-102n to participate in the MCData communication. The MCData UEs 102a-102n is registered with the MCData server 104 for FD and DS for one-to-one and group data communication. The MCData manager 604 authorizes the MCData UEs 102a-102n based on their registration with the MCData server 104 for receiving MCData service.

The MCData manager 604 can also be configured to determine whether any policy is to be asserted to limit certain types of message or content to certain MCData UEs due to location or user privilege or affiliation; and further determine the eligible MCData UE (s) after policy assertion.

The MCData manager 604 coordinates with a group management server 108 to resolve the group identifier (MCData group ID) associated with the group of second MCData UEs 102b-102n for group MCData communication. Further, the MCData manager 604 determines the affiliation status of the second MCData UEs 102b-102n based on the information received from the group management server 108.

The MCData manager 604 can be configured to aggregate MCData download completed report messages received from the second MCData UEs 102b-102n, in case of group communication.

In an embodiment, the processor 606 (for example; a hardware unit, an apparatus, a Central Processing Unit (CPU), a Graphics Processing Unit (GPU), etc.,) communicatively coupled to a memory 608 (e.g., a volatile memory and/or a non-volatile memory); the memory 608 includes storage locations configured to be addressable through the processor 606.

In an embodiment, the memory 608 can be configured to store the MCData download completed report messages received from the second MCData UEs 102b-102n. The memory 608 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 608 may, in some examples, be considered a non-transitory storage medium. The term "non-transitory" may indicate that the storage medium is not embodied in a carrier wave or a propagated signal. However, the term "non-transitory" should not be interpreted that the memory 608 is non-movable. In some examples, the memory 608 can be configured to store larger amounts of information than the memory. In certain examples, a non-transitory storage medium may store data that can, over time, change (e.g., in Random Access Memory (RAM) or cache).

Although the FIG. 6 shows the hardware components of the MCData server 104 but it is to be understood that other embodiments are not limited thereon. In other embodiments, the MCData server 104 may include less or more number of components. Further, the labels or names of the components are used only for illustrative purpose and does not limit the scope of the invention. One or more components can be combined together to perform same or substantially similar function to establish the data communication in the MCData communication system.

FIG. 7 is a flow diagram 700 illustrating a method for managing communication in the MCData communication system, according to an embodiment as disclosed herein. The steps or operations (step numbers) are performed by the communicator 602. At step 702, the method includes receiving a MCData request message from the first MCData UE 102*a* from a plurality of MCData UEs. At step 704, the method includes transmitting the MCData request message to the second MCData UE 102*b* from the plurality of MCData UEs.

At step 706, the method includes receiving a MCData response message from the second MCData UE 102*b*. At step 708, the method includes transmitting the MCData response message to the first MCData UE 102*b*.

In an embodiment, the first MCData UE 102*a* from the plurality of MCData UEs and the second MCData UE 102*b* from the plurality of MCData UEs are in one of an on-network data communication system 100 and a combination of the on-network data communication system and an off-network data communication system 200.

In an embodiment, when the first MCData UE 102*a* and the second MCData UE 102*b* are the on-network data communication system 100, the proposed method and system provides mechanisms for FD and DS between the first MCData UE 102*a* and the one or more second MCData UE(s) 102*b*-102*n*.

In an embodiment, when the first MCData UE 102*a* and the second MCData UE 102*b* are in combination of the on-network data communication system and an off-network data communication system 200, the proposed method and system can be used to efficiently utilize the resources using the on-network procedure (i.e., unicast procedure) is used for the SIP signaling and an off-network procedure (e.g., broadcast/multicast procedure (i.e., one-to-many procedure)) for the MCData transmission, when the MC service is provided by the relay node 110 (i.e., UE-network relay node).

FIG. 8 is a sequence diagram illustrating various signaling messages for file upload using Hyper Text Transfer Protocol (HTTP), according to an embodiment as disclosed herein. The procedure in the FIG. 8 describes the case where the first MCData UE 102*a* is uploading file to media storage function of the MCData server 104. Initially, the first MCData UE 102*a* on the MCData client 1 is registered for receiving MCData service.

At step 802, the MCData user at the first MCData UE 102*a* initiates a file upload request of the chosen file.

At step 804, the file to be uploaded is received by the media storage client at the first MCData UE 102*a* and sent to the media storage function on the MCData server 104 for storing using the MCData upload data request.

At step 806, the MCData server 104 also applies transmission control policy before storage and provides a MCData upload data response indicating success (along with file URL to the media storage client at the MCData client 1) or failure.

FIG. 9 is a sequence diagram illustrating various signaling messages for file download using HTTP, according to an embodiment as disclosed herein. The procedure in the FIG. 9 describes the case where the MCData user is downloading the file from the media storage function of the MCData server 104.

Initially, the MCData user on the first MCData UE 102*a* is registered for receiving the MCData service. At step 902, the MCData user at the first MCData UE 102*a* initiates a file download request available at the indicated URL.

At step 904, the file available at the URL (received in MCData FD request) is requested to be downloaded by the media storage client at the first MCData UE from the media storage function on the MCData server 104 using a MCData download data request.

At step 906, the media storage function applies reception control policy and provides a MCData download data response including the file to the media storage client at the first MCData UE 102*a*.

FIG. 10 is a sequence diagram illustrating various signaling messages communicated between a first MCData UE, the MCData server and a second MCData UE for one-to-one FD using HTTP, according to an embodiment as disclosed herein. The MCData file distribution capability is supported for one-to-one and one-to-many or group communication. This capability is expected to be used in the MCData services like conversation management, for carrying application data etc. The File distribution can be selected with sender's (i.e., first MCData UEs) preference as mandatory download or download at receiver's (second MCData UE) discretion. When download option at receiver's discretion, the receiver can retrieve immediately or defer retrieval or reject receiving it. Sender can cancel the ongoing file distribution or pending for retrieval at any time. If requested the sender will receive the download report.

The procedure in FIG. 10 describes the case where the first MCData UE 102*a* is initiating one-to-one data communication for sending file to the second MCData UE, with or without download completed report request.

The following are the pre-conditions for one-to-one data communication for sending file to the second MCData UE 102*b* using HTTP. The MCData users on the first MCData UE 102*a* and the second MCData UE 102*b* are already registered for receiving MCData service. The file to be distributed is uploaded to media storage function on MCData server 104.

At step 1002, the MCData user at the first MCData UE 102*a* initiates a file distribution request to a selected MCData user (i.e., a MCData user of the second MCData UE 102*b*).

At step 1004, the first MCData UE 102*a* sends a MCData FD request towards the MCData server. The MCData FD request contains content payload in the form of file URL and may contain the file metadata information. The MCData FD request contains one MCData user for one-to-one data communication as selected by the MCData user at the first MCData UE 102*a*. The MCData FD request contains conversation identifier for message thread indication. If the MCData user at the first MCData UE 102*a* has requested to mandatory download at the recipient side, then MCData FD request contains mandatory download indication. The MCData FD request may contain download completed report indication if selected by the user at first MCData UE 102*a*.

At step 1006, the MCData server 104 checks whether the MCData user at the first MCData UE 102a is authorized to send the MCData FD request.

At step 1008, the MCData server 104 also applies transmission and reception control and the necessary policy to ensure that appropriate data is transmitted between the MCData UEs.

At step 1010, the MCData server 104 initiates the MCData FD request towards the second MCData UE 102b.

At step 1012, the receiving MCData client 2 at the second MCData UE 102b notifies the MCData user about the incoming MCData FD request (including file metadata, if present) which may be either accepted or rejected or ignored. If the request includes mandatory download indication in the MCData FD request an accepted response is assumed.

At step 1014, the MCData user of the second MCData UE 102b may provide a response (accept or reject) or not (ignore) to the notification, then the MCData client 2 at the second MCData UE 102b sends the MCData FD response to the MCData server 104. The second MCData UE 102b automatically sends accepted MCData FD response when the incoming request included mandatory download indication.

At step 1016, the MCData server 104 forwards the MCData FD response to the first MCData UE 102a.

At step 1018, the MCData client 2 at the second MCData UE 102b downloads the file either automatically (for mandatory download) or based upon the MCData user of the second MCData UE 102b subsequent acceptance. The MCData client 2 at the second MCData UE 102b records file download completed and notifies MCData user of the second MCData UE 102b.

At step 1020, the second MCData UE 102b initiates a MCData download completed report for reporting file download completed, if requested by the MCData user of the first MCData UE 102a.

At step 1022, the MCData file download completed report from the MCData user may be stored by the MCData server 104 for download history interrogation from the authorized MCData users. MCData download completed report is sent by the MCData server 104 to the MCData user at the first MCData UE 102a.

FIG. 11 is a sequence illustrating various signaling messages communicated between the first MCData UE, the MCData server and the second MCData UE for one-to-one FD using media plane, according to an embodiment as disclosed herein. The procedure in the FIG. 11 describes the case where the first MCData UE 102a is initiating one-to-one data communication for sending file to the second MCData UE 102b, with or without download completed report request. Initially, the MCData users on the first MCData UE 102a and the second MCData UE 102b are already registered for receiving MCData service.

At step 1102, the MCData user at the first MCData UE 102a initiates a file distribution request to a selected MCData user.

At step 1104, first MCData UE 102a sends a MCData FD request towards the MCData server 104. The MCData FD request may contain the file metadata information. The MCData FD request contains one MCData user for one-to-one data communication as selected by the MCData user at the first MCData UE 102a. The MCData FD request contains conversation identifier for message thread indication. The MCData FD request may contain mandatory download indication. The MCData FD request may contain download completed report indication if selected by the MCData user at the first MCData UE 102a.

At step 1106, the MCData server 104 checks whether the MCData user at the first MCData UE 102a is authorized to send MCData FD request.

At step 1108, the MCData server 104 also applies transmission and reception control and the necessary policy to ensure that appropriate data is transmitted between the first MCData UE 102a and the second MCData UE 102b.

At step 1110, the MCData server 104 initiates the MCData FD request towards the second MCData UE 102b.

At step 1112, the second MCData UE 102b notifies the MCData user about the incoming MCData FD request (including file metadata, if present) which may be either accepted or rejected or ignored. If the request includes mandatory download indication in the MCData FD request an accepted response is assumed.

At step 1114, if the second MCData UE 102b provides a response (accept or reject) to the notification, then the second MCData UE 102b sends the MCData FD response to the MCData server 104. The second MCData UE 102b automatically sends accepted MCData FD response when the incoming request included mandatory download indication.

At step 1116, the MCData server 104 forwards the MCData FD response from the second MCData UE 102b back to the first MCData UE 102a.

At step 1118, the first MCData UE 102a distributes the file over the established media plane to the MCData server 104.

At step 1120, the MCData server 104 distributes the file received from the first MCData UE 102a to the second MCData UE 102b over the established media plane. The file download report is shared by the second MCData UE 102b, if requested by the MCData user at the first MCData UE 102a. After file transaction is completed, the media plane is released. The second MCData UE 102b records file download completed and notifies the second MCData UE 102b.

The MCData server 104 is not required to wait for the complete download of file from the first MCData UE 102a prior to initiating file distribution to the second MCData UE 102a.

At step 1122, the second MCData UE 102b initiates a MCData download completed report for reporting file download completed, if requested by the MCData user at the first MCData UE 102a.

At step 1124, the MCData file download completed report from the second MCData UE 102b may be stored by the MCData server for download history interrogation from the authorized MCData users. The MCData download completed report is sent by the MCData server 104 to the MCData user at the first MCData UE 102a.

FIG. 12 is a sequence diagram illustrating various signalling messages communicated between the first MCData UE, the MCData server and a group of second MCData UEs for group standalone FD using HTTP, according to an embodiment as disclosed herein. The procedure in the FIG. 12 describes the case where the first MCData UE 102a is initiating group standalone data communication for sending file to multiple MCData users, with or without download completed report request.

The following are the pre-conditions for initiating group standalone data communication for sending file to multiple MCData users. The MCData users on the second MCData UEs 102b-102n belong to the same group and are already registered for receiving MCData service and affiliated. The file to be distributed is uploaded to media storage function on the MCData server 104.

At step 1202, the MCData user at the first MCData UE 102a initiates a file distribution request to multiple MCData users selecting a pre-configured group (identified by MCData group ID) and optionally particular members from that group.

At step 1204, the first MCData UE 102a sends a MCData group standalone FD request towards the MCData server 104. The MCData FD request contains content payload in the form of file URL and may contain the file metadata information. The MCData group standalone data request contains target recipient(s) as selected by the MCData user at the first MCData UE 102a. The MCData group standalone FD request contains conversation identifier for message thread indication. If MCData user at the first MCData 102a has requested to mandatory download at the recipient side, then the MCData group standalone FD request contains mandatory download indication. The MCData group standalone FD request may contain download completed report indication if selected by the user at the first MCData UE 102a.

At step 1206, the MCData server 104 checks whether the MCData user at the first MCData UE 102a is authorized to send MCData group standalone FD request. The MCData server 104 resolves the MCData group ID to determine the members of that group and their affiliation status, based on the information from the group management server 108.

At step 1208, the MCData server 104 also applies transmission and reception control and the necessary policy to ensure that appropriate data is transmitted between the MCData UEs.

At step 1210, the MCData server 104 initiates the MCData group standalone FD request towards each MCData user determined at step 1206.

At step 1212, the second MCData UEs 102b to 102n notify the user about the incoming MCData group standalone FD request (including file metadata, if present) which may be either accepted or rejected or ignored. If the request includes mandatory download indication in the MCData group standalone FD request an accepted response is assumed.

At step 1214, the MCData user on the second MCData UEs 102b to 102n provides a response (accept or reject or ignore) to the notification, then respective second MCData UEs 102b to 102n sends the MCData group standalone FD response to the MCData server 104. The second MCData UEs 102b to 102n automatically sends accepted MCData group standalone FD response when the incoming request included mandatory download indication.

At step 1216, the MCData server 104 forwards the MCData group standalone FD response to the first MCData UE 102a. It should be noted that the step 1216 can occur at any time following the step 1210, and prior to step 1218 depending on the conditions to proceed with the file transmission.

At step 1218, the second MCData UE(s) 102b-102n downloads the file either automatically (for mandatory download) or based upon the MCData user subsequent acceptance. The second MCData UEs 102b-102n successfully receiving the file, records file download completed and notifies the MCData user.

At step 1220, the second MCData UEs 102b-102n, successfully receiving the file, initiate a MCData download completed report for reporting file download completed, if requested by the MCData user at the first MCData UE 102a.

At step 1222, the MCData file download completed report from the second MCData UE(s) 102b-102n may be stored by the MCData server 104 for download history interrogation from the authorized MCData users. The MCData file download completed report from each MCData user may be aggregated.

At step 1224, the aggregated or individual MCData download completed report is sent by the MCData server 104 to the MCData user at the first MCData UE 102a.

FIG. 13 is a sequence diagram illustrating various signalling messages communicated between the first MCData UE, the MCData server and the group of second MCData UEs for group standalone FD using media plane, according to an embodiment as disclosed herein. The procedure in the FIG. 13 describes the case where the first MCData UE 102a is initiating group standalone data communication for sending file to multiple MCData users, with or without download completed report request. Initially, the MCData users on the second MCData UEs 102b to 102n belong to the same group and are already registered for receiving MCData service and affiliated.

At step 1302, the MCData user at the first MCData UE 102a initiates a file distribution request to multiple MCData users selecting a pre-configured group (identified by MCData group ID) and optionally particular members from that group.

At step 1304, the first MCData UE 102a sends a MCData group standalone FD request towards the MCData server 104. The MCData group standalone FD request may contain the file metadata information. The MCData group standalone data request contains target recipient(s) as selected by the MCData user at the first MCData UE 102a. The MCData group standalone FD request contains conversation identifier for message thread indication. MCData group standalone FD request may contain mandatory download indication. The MCData group standalone FD request may contain download completed report indication if selected by the MCData user at the first MCData UE 102a.

At step 1306, the MCData server 104 checks whether the MCData user at the first MCData UE 102a is authorized to send MCData group standalone FD request. The MCData server 104 resolves the MCData group ID to determine the members of that group and their affiliation status, based on the information from the group management server 108.

At step 1308, the MCData server 104 also applies transmission and reception control and the necessary policy to ensure that appropriate data is transmitted between the MCData UEs.

At step 1310, the MCData server 104 initiates the MCData group standalone FD request towards each MCData user determined at step 1306.

At step 1312, the second MCData UE 102b to 102n notifies the user about the incoming MCData group standalone FD request (including file metadata if present) which may be either accepted or rejected or ignored. If the request includes mandatory download indication in the MCData group standalone FD request an accepted response is assumed.

At step 1314, if the target MCData user on the second MCData UE 102b to 102n provides a response (accept or reject) to the notification, then the respective MCData UE sends the MCData group standalone FD response to the MCData server 104. The second MCData UEs 102b to 102n automatically sends accepted MCData group standalone FD response when the incoming request included mandatory download indication.

At step 1316, the MCData server 104 forwards the MCData group standalone FD response to the first MCData UE 102a. It should be noted that the step 1316 can occur at any time following the step 1310, and prior to step 1318 depending on the conditions to proceed with the file transmission.

At step 1318, the first MCData UE 102a and the MCData server 104 have successfully established media plane for file transmission and the first MCData UE 102a transmits the file data.

At step 1320, the MCData server 104 distributes the file received from the first MCData UE 102a to the second MCData UE 102b to 102n over the established media plane. The distribution of file can be through unicast or through MBMS bearer(s). For distribution through MBMS bearer(s), usage of MBMS transmission (on-network) is executed. The file download report is shared by the second MCData UEs 102b-102n, if requested by the MCData user at the first MCData UE 102a. After file transaction is completed, the media plane is released. It should be noted that the MCData server 104 is not required to wait for the complete download of file from the first MCData UE 102a prior to initiating file distribution to the second MCData UEs 102b to 102n.

At step 1322, the second MCData UEs 102b-102n successfully receiving the file, records file download completed and notifies the respective MCData user.

At step 1324, the second MCData UE(s) 102b-102n initiates a MCData download completed report for reporting file download completed, if requested by the MCData user at the first MCData UE 102a.

At step 1326, the MCData file download completed report from the second MCData UE(s) 102b-102n may be stored by the MCData server 104 for download history interrogation from the authorized MCData users. The MCData file download completed report from each MCData user may be aggregated.

At step 1328, the aggregated or individual MCData file download completed report is sent to the disposition requesting MCData user at the first MCData UE 102a.

FIG. 14 is a flow diagram 1400 illustrating a method for managing Data Streaming (DS) in MCData communication system, according to an embodiment as disclosed herein. The steps of the flow diagram 1400 are performed by the communicator 602. At step 1402, the method includes receiving a MCData stream data start request message from a first MCData UE 102a. At step 1404, the method includes transmitting a MCData stream data start request message to one or more second MCData UEs 102b-102n.

At step 1406, the method includes receiving a MCData stream data response message from the one or more second MCData UEs 102b-102n. At step 1408, the method includes transmitting the MCData stream data response message to the first MCData UE 102a.

At step 1410, the method includes controlling the data streaming based on a request received from one of the first MCData UE 102a and the one or more second MCData UEs 102b-102n.

At step 1412, the method includes receiving a MCData stream data release request message from the first MCData UE 102a for releasing MCData stream. At step 1414, the method includes transmitting the MCData stream data release request message to the one or more second MCData UEs 102b-102n.

The flow diagram 1400 describes the procedure for the first MCData UE 102a initiating a data communication for streaming content present on the first MCData UE 102a to the one or more second MCData UE(s) 102b-102n. The various signaling messages exchanged between the first MCData UE 102a, the MCData server 104 and the one or more second MCData UEs 102b-102n are described in the FIG. 15.

Further, the procedure in which the first MCData UE 102a initiating a data communication for streaming content present on the network 106 to the one or more second MCData UEs 102b-102n are described in the FIG. 16.

FIG. 15 is a sequence diagram illustrating various signaling messages where the first MCData UE is initiating a data communication for streaming content to second MCData UE(s) with or without stream report request, according to embodiments as disclosed herein. The procedure in the FIG. 15 focuses on the case, where the first MCData UE 102a is initiating a data communication for streaming content present on the first MCData UE 102a to second MCData UE(s) 102b-102n, with or without stream report request. Initially the MCData users on the first MCData UE 102a and the one or more second MCData UEs 102b-102n are already registered for receiving MCData service.

At step 1502, the MCData user at the first MCData UE 102a initiates a data streaming request to a selected second MCData UE 102b. The MCData user at the first MCData UE 102a may initiate data streaming request to multiple MCData users either by selecting list of MCData users or selecting a pre-configured URI list or selecting a pre-configured group.

At step 1504, the data to be streamed is available on the Media storage client at the first MCData UE 102a and sent to the MCData server 104 (via SIP core) for data streaming using a MCData stream data start request. The MCData stream data start request may contain the URL corresponding to streaming and the stream metadata information. The MCData stream data start request may contain only one MCData user or list of MCData users or a pre-configured URI list or a pre-configured group as selected by the user at MCData client 1. The MCData stream data start request contains conversation identifier for message thread indication. If the MCData stream data start request should be coupled with previously sent or received messages or message flows; the message thread indication shall use the same indication as was used for those previous messages. If the conversation hang timer has expired then a new conversation identifier is included and previous messages are no longer correlated. If MCData user at the first MCData UE 102a has requested for auto reception at the recipient side, then MCData stream data start request contains auto reception indication. The second MCData UE 102b will not prompt user for acceptance of MCData auto reception request but simply notifies about incoming MCData auto reception request and will automatically start streaming data. The MCData stream data start request may contain download progress update request if indicated by the user at the first MCData UE 102a.

At step 1506, the MCData server 104 checks whether the MCData user at the first MCData UE 102a is authorized to send MCData stream data start request. If the request is initiated towards multiple MCData users then URI list or group is resolved to its members e.g., by contacting group management server.

At step 1508, the MCData server 104 also applies transmission and reception control and the necessary policy to ensure that appropriate data is transmitted between the MCData UEs.

At step 1510, the MCData server 104 initiates the MCData stream data start request towards each of the second MCData UEs 102b-102n determined in the step 1508. When the MCData user belongs to a partner MCData system then the MCData stream data start request is sent via the MCData server 104 of the partner MCData server.

At step 1512, the second MCData UE 102*b* notifies the user about the incoming MCData stream data start request (including stream metadata if present) which may be either accepted or rejected or ignored. MCData user may not be sought consent if the request includes mandatory download indication in the MCData stream data start request and instead only notify the MCData user about incoming stream.

At step 1514, if the second MCData UE 102*b* provides a response (accept or reject or receive URL only) to the notification, then the second MCData UE 102*b* sends the MCData stream data start response to the MCData server 104.

At step 1516, the one or more second MCData UEs 102*b*-102*n* logs start if the MCData user response is accept in the step 1514.

At step 1518, the MCData server 104 sends the MCData stream data start response to the first MCData UE 102*a*.

At step 1520, the MCData user at the first MCData UE 102*a* controls (e.g., play, stop, forward, pause etc.) the streaming data over the media plane.

At step 1522, the first MCData UE 102*a* streams the data to the media relay function on the MCData server 104.

At step 1524, the Media relay function streams the data received from the first MCData UE 102*a* to each user accepting to receive the stream.

At step 1526, on request from the MCData user at the second MCData UE 102*b* to stop receiving data stream, the second MCData UE 102*b* initiates the MCData stream inactive request towards the MCData server 104. Further, the second MCData UE 102*b* maintains log that receiving stream has been stopped.

At step 1528, Media streaming from the media relay function on the MCData server 104 to the second MCData UE 102*b* is stopped.

At step 1530, on request from the MCData user at the second MCData UE 102*b* to start receiving data stream, the second MCData UE 102*b* initiates the MCData stream active request towards the MCData server 104. Further, the second MCData UE 102*b* maintains log that receiving stream has been started.

At step 1532, the MCData user on the first MCData UE 102*a* may decide to stop delivering data stream to second MCData UEs 102*b*-102*n* by sending MCData stream data release request towards the MCData server 104. The MCData server 104 forwards the request to all the second MCData UEs 102*b*-102*n* receiving data stream.

At step 1534, the Media stream delivery is stopped and the second MCData UEs 102*b*-102*n* sends back response MCData stream data release response to the first MCData UE 102*a* via the MCData server 104.

At step 1536, if download progress update request indication is present in step 1504, then the second MCData UEs 102*b*-102*n* initiates MCData stream report request and MCData server 104 confirms the receipt with MCData stream report response.

At step 1538, the MCData stream report from each MCData user may be aggregated and stored by the MCData server 104 for report history interrogation from the authorized users.

At step 1540, the aggregated or individual MCData stream data report request is sent by the MCData server 104 to the stream data report requesting user at the first MCData UE 102*a* and also to authorized MCData users. The second MCData UEs 102*b*-102*n* receiving the reports confirm with a response to MCData server 104. Multiple such aggregated stream data reports can be shared by the MCData server 104.

FIG. 16 is a sequence diagram illustrating various signaling messages in which the first MCData UE initiates a data communication for streaming content to the second MCData UE(s), with or without stream report request, according to embodiments as disclosed herein. The procedure in the FIG. 16 focuses on the case where the MCData user at the first MCData UE 102*a* is initiating a data communication for streaming content present on the network (i.e., at the MCData server 104) to second MCData UE(s) 102*b*-102*n*, with or without stream report request.

At step 1602, the MCData user on the first MCData UE 102*a* and the second MCData UE 102*b* are already registered for receiving MCData service. The MCData user at the first MCData UE 102*a* initiates a data streaming request to a selected MCData user. The MCData user at the first MCData UE 102*a* may initiate data streaming request to multiple MCData users either by selecting list of MCData users or selecting a pre-configured URI list or selecting a pre-configured group.

At step 1604, the data to be streamed is available on the Media storage function at MCData server 104 and MCData stream data control request is sent to the MCData server 104 (via SIP core) for data streaming to second MCData UEs 102*b*-102*n*. The MCData stream data control request contains the URL corresponding to the content on network 106 to be streamed and may contain the stream metadata information. The MCData stream data control request may contain only one MCData user or list of MCData users or a pre-configured URI list or a pre-configured group as selected by the MCData user at the first MCData UE 102*a*. The MCData stream data control request contains conversation identifier for message thread indication. If the MCData stream data control request should be coupled with previously sent or received messages or message flows; the message thread indication shall use the same indication as was used for those previous messages. If the conversation hang timer has expired then a new conversation identifier is included and previous messages are no longer correlated. If MCData user has requested for auto reception at the recipient side, then MCData stream data control request contains auto reception indication. The second MCData UE(s) 102*b*-102*n* will not prompt user for acceptance of MCData auto reception request but simply notifies about incoming MCData auto reception request and will automatically start streaming data. The MCData stream data control request may contain download progress update request if indicated by the MCData user at the first MCData UE 102*a*.

At step 1606, the MCData server 104 checks whether the MCData user at the first MCData UE 102*a* is authorized to send MCData stream data control request. If the request is initiated towards multiple MCData users then URI list or group is resolved to its members e.g., by contacting group management server 108.

At step 1608, the MCData server 104 also applies transmission and reception control and the necessary policy to ensure that appropriate data is transmitted between the MCData UEs.

At step 1610, the MCData server 104 initiates the MCData stream data request towards each of the MCData user determined in step 1608. When the MCData user belongs to a partner MCData system then the MCData stream data request is sent via the MCData server 104 of the partner MCData server.

At step 1612, the second MCData UE(s) 102*b*-102*n* notifies the user about the incoming MCData stream data request (including stream metadata if present) which may be either accepted or rejected or ignored. MCData user may not be sought consent if the request includes mandatory download indication in the MCData stream data request and instead only notify the MCData user about incoming stream.

At step 1614, if the second MCData UE(s) 102b-102n provides a response (accept or reject or receive URL only) to the notification, then the second MCData UE(s) 102b-102n sends the MCData stream data response to the MCData server 104.

At step 1616, the MCData server 104 sends the MCData stream data start response to the first MCData UE 102a.

At step 1618, the MCData user at the first MCData UE 102a having controls (e.g., play, pause, forward) requests to start playing the stream which results in MCData server 104 multicasting the data stream.

At step 1620, the MCData users at the first MCData UE 102a and at the second MCData UEs 102b-102n join the multicast stream by sending a MCData stream join request.

At step 1622, the second MCData UEs 102b-102n logs start if the MCData user on that client has joined receiving the multicast stream.

At step 1624, the MCData server 104 streams the data to the first MCData UE 102a and the second MCData UEs 102b-102n of each MCData user accepting to receive the stream.

At step 1626, on request from MCData user to stop receiving data stream, the second MCData UE 102b initiates MCData stream leave request towards the MCData server 104. Media streaming from MCData server 104 to the second MCData UE 102 is stopped and the second MCData client maintains log that receiving stream has been stopped.

At step 1628, on request from the MCData user to start receiving data stream, the second MCData UE 102b initiates MCData stream join request towards the MCData server 104. Further, the second MCData UE 102b maintains log that receiving stream has been started.

At step 1630, the MCData user on the first MCData UE 102a may decide to stop delivering data stream to second MCData UEs 102b-102n by sending MCData stream leave request towards the MCData server 104.

At step 1632, when the media stream delivery is stopped, the second MCData users receiving stream initiate MCData stream leave request towards the MCData server 104. Further, the second MCData UE 102b maintains log that receiving stream has been stopped.

At step 1634, if download progress update request indication is present in step 1604, then the second MCData UE 102b initiates MCData stream report request and MCData server 104 confirms the receipt with MCData stream report response.

At step 1636, the MCData stream report from each MCData user may be aggregated and stored by the MCData server 104 for report history interrogation from the authorized users.

At step 1638, the aggregated or individual MCData stream data report request is sent by the MCData server 104 to the stream data report requesting user at the first MCData UE 102a and also to authorized MCData users. The second MCData UEs 102b-102n receiving the reports confirm with a response to MCData server 104. Multiple such aggregated stream data reports can be shared by the MCData server 104 as shown in the FIG. 16.

FIG. 17 is a block diagram illustrating various hardware components of the relay node 110, according to an embodiment as disclosed herein. In an embodiment, the relay node includes a communicator 1702, a MCData manager 1704, a processor 1706 and a memory 1708. The communicator 1702 is configured to communicate with the network 106 and communicate internally between hardware components in the relay node 110. The processor 1706 is communicated with the communicator 1702, the MCData manager 1704, and the memory 1708.

The MCData manager 1704 is configured to route the IP packet between the MCData server 104 and at least one second MCData UE 102b-102n for the MCData SIP signalling based on the on-network procedure. Further, the MCData manager 1704 is configured to route the IP packet (media) between the MCData server 104 and the at least one second MCData UE 102b-102n based on the off-network procedure for the data transmission. Based on routing of the IP packet between the MCData server 104 and the second MCData UE 102b for the MCData signalling based on the on-network procedure, and routing of the IP packet (media) between the MCData server and the at least one second MCData UE 102b-102n based on the off-network procedure, the MCData manager 1704 is configured to establish the data communication between the first MCData UE 102a and the second MCData UE 102b through the MCData server 104 and the relay node 110.

The MCData manager 1704 is configured to broadcast the IP packet to the second MCData UE 102b over the PC5 interface based on at least one of layer 3 procedure and the ProSe layer 2 procedure.

The memory 1708 stores IP packet related information. The memory 1708 also stores instruction to manage the MCData communication system. The memory 1708 also stores instructions to be executed by the processor 1706. The memory 1708 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 1708 may, in some examples, be considered a non-transitory storage medium. The term "non-transitory" may indicate that the storage medium is not embodied in a carrier wave or a propagated signal. However, the term "non-transitory" should not be interpreted that the memory 408b is non-movable. In some examples, the memory 1708 can be configured to store larger amounts of information than the memory. In certain examples, a non-transitory storage medium may store data that can, over time, change (e.g., in Random Access Memory (RAM) or cache).

Although the FIG. 17 shows the hardware components of the relay node 100 but it is to be understood that other embodiments are not limited thereon. In other embodiments, the relay node 110 may include less or more number of components. Further, the labels or names of the components are used only for illustrative purpose and does not limit the scope of the invention. One or more components can be combined together to perform same or substantially similar function to establish the data communication in the MCData communication system.

FIG. 18 is a flow diagram 1800 illustrating a method for managing the data communication between the first MCData UE and the second MCData UE through the MCData server and the relay node, when the first MCData UE and the second MCData UE are in the combination of the on-network data communication system and the off-network data communication system 200, according to an embodiment as disclosed herein. The steps or operations (step numbers) are performed by the MCData manager 1704.

At step 1802, the method includes routing the IP packet between the MCData server 104 and at least one second MCData UE 102b for the MCData SIP signalling based on the on-network procedure. At step 1804, the method includes routing the IP packet (media) between the MCData server 104 and the at least one second MCData UE 102b based on the off-network procedure for the MCData transmission. At step 1806, the method includes establishing the data communication between the first MCData UE 102a and the second MCData UE 102b through the MCData server 104 and the relay node 110.

The proposed method can be used to reduce the number of unicast transmission between the media server to the UE, by local routing at the relay node. The method can be used increase the number of remote UEs served by the relay node.

The proposed method can be used to reduce route the media streams within the relay node in an effective manner. The method can be used to switch multiple unicast transmission to a broadcast transmission based on location of the relay node.

The various actions, acts, blocks, steps, or the like in the flow diagram 1800 may be performed in the order presented, in a different order or simultaneously. Further, in some embodiments, some of the actions, acts, blocks, steps, or the like may be omitted, added, modified, skipped, or the like without departing from the scope of the invention.

FIG. 19 is a sequence diagram illustrating various signaling messages for managing data communication between the first MCData UE and the second MCData UE through the MCData server and the relay node, according to an embodiment as disclosed herein.

In an implementation, there can be multiple Relay nodes 110, Remote MCData UEs and MCData UEs belonging to same MCData group that can utilize these embodiments for an efficient connectivity.

1. The relay node 110 does a SIP registration with the MCData service. In registration, the relay node 110 indicates its device capability, a relay capability, a gateway capability, a local IP Access (LIPA) gateway (L-GW) capability, its PC-5 Relay node ID, its IP address, a network address translation (NAT) IP address range (optionally mapping of the NAT IP address range with the Group IDs) and other possible parameters. Once registered, the relay node 110 is enabled to serve to the remote UEs.

2. The remote MC UEs registers with the relay node 110, to obtain proximity services. In registration with the relay node 110, the remote MC UE indicates its MC capability (for example it is a PS UE, Group IDs it belong to (or only the Group IDs supported by the Relay node)) and other possible parameters. Once registered, the relay node assigns an IP address to the remote MC UE.

The local IP addresses are assigned to the remote UEs by the relay node 110, so that, the relay node can enable the LIPA function for the MCData group media.

Additionally, the Relay node 110, binds the assigned IP address, UE ID, corresponding Group IDs and other possible parameters. Further, the relay node 110 uses the binding details to convert the Layer 3 unicast transmission (using at least one of: 'Source IP address', 'Destination IP address' and other possible parameters (for example port number)) to the ProSe Layer 2 One-to-Many communication using the Group ID (alternatively broadcast ID (can be the default Group ID for broadcasts)). The relay node 110 may also fork the IP packets to the media GW for lawful interception and also to distribute the media to other group members registered with network or with a different relay node 110.

In an embodiment, the relay node 110 assigns two IP addresses to the remote MC UE, one for signaling and one for local IP access (group media communication).

In an embodiment, the relay node 110 performs a deep packet inspection of the IP packets, to identify the signaling and media packets and perform appropriate following actions:

[2] a) Relay the signaling packets, or

[3] b) Perform local broadcast of the media packets with optional forking of the media packets to the media gateway.

3. Further the Remote MC UE does a SIP registration with the MCData service via the relay node 110. In registration with the MCData service, the remote MCData UE indicates its communication mode and provides its location and the PC-5 Relay node ID of the Relay node 110 to which it is connected. Further the Remote UE includes other possible parameters required to enable the Local IP access. Being out of coverage of the network (has no connectivity with the network directly using Uu interface), the Remote MCData UE indicates 'OUT' as the communication mode.

4. Any MC UE which is under network coverage (has connectivity with the network using Uu interface) does a regular SIP registration with the MCData service. In registration with the MCData service, the MC UE optionally indicates its communication mode and provides its location. Being in the coverage of the network, the MC UE optionally indicates 'IN' as the communication mode.

5. Multiple MC UEs or Remote MC UEs can register for the MCData service following the procedure in steps 2, 3 and 4.

6. The MCData service maintains the location and communication mode of the UEs of each MCData group registered for the MCData service. In an embodiment, the communication mode indicates the LTE access network connectivity (IN (using Uu Interface) and OUT (using PC5 interface)).

7. A UE (Remote MCData UE or MCData UE), can initiate a MCData communication. In the flow, the Remote MCData UE initiates a MCData group communication with the MCData Group. Following regular MCData group communication procedures, the UE sends a SIP INVITE to the MCData server 104.

8. The MCData server 104 forks the SIP INVITE to all registered group members (MCData UEs and Remote MCData UEs) following the regular procedures.

9. Further, the MCData server 104 checks the location and the Relay node ID of the registered Remote MCData UEs of the MCData group for which call is initiated. Upon determining a list of the Relay nodes 110 which are serving Remote MCData UEs of the MCData group for which the call was initiated, the MCData server forks the SIP INVITE to all such Relay nodes. In the forked SIP INVITE to the Relay UEs, the MCData server indicates to activate the LIPA to fork the media locally along with an optional unicast relay to the MCData server (i.e., Relay nodes to use the SDP details to identify the session details and perform the appropriate actions). In the flow, the MCData server 104 indicates to activate LIPA to fork the media locally and also relay an unicast stream to the MCData server.

In an embodiment, instead of the SIP or along with the SIP, any other application layer protocols like HTTP are used to configure the Relay nodes 110 to perform the Local Gateway (L-GW) functionality.

10. The MCData UEs and the Remote MCData UEs respond with a 200 OK message and establish the call.

11. The Relay node 110 responds to the SIP INVITE with a 200 OK message and activates LIPA.

Upon receiving media from the Remote MCData UE, the Relay node 110 forks the media over the PC5 broadcast to the MCData group (either using Layer 3 procedures or using ProSe Layer 2 procedures). Also, the relay node forks the unicast stream to the MCData server. The MCData server further forwards the media to other Relay nodes serving the MCData group and any MCData UE under the coverage of the network.

FIG. 20 is a sequence diagram illustrating broadcast mechanisms, according to an embodiment as disclosed herein. The possible procedures of Layer 3 or ProSe Layer 2 broadcast are detailed in the FIG. 20. In an implementations, the when the replay node receives the IP packet (media) from the transmitting UE-1, then the relay node performs the deep packet inspection (DPI) and decides whether to perform Prose One-to-many communication or to perform Layer 3 (L3) Local IP Broadcast. In case, if the relay node decides to perform the Prose One-to-many communication, then the relay node performs the IP forking of the IP packet (media) and provides a IP packet (media) to the LIPA Gateway and one to the Media Gateway. Once the IP packet (media) is received by the LIPA GW function, it distributes the IP packet (media) to the group members over the PC-5 interface. The media GA will forwards the media packet to the UEs (UE-n) in the On-network or to another relay node. In an embodiment, if the Relay node 106 decides to perform the L3 broadcast (IP broadcast), then the relay node performs the IP forking of the IP packet (media) and provides a IP packet (media) to the LIPA Gateway and one to the Media Gateway. Once the IP packet (media) is received by the LIPA GW function, it distributes the IP packet (media) to the group members performing IP broadcast. The media GA will forwards the IP packet (media) to the UEs (UE-n) in the On-network or to another relay node.

The embodiments disclosed herein can be implemented through at least one software program running on at least one hardware device and performing network management functions to control the elements. The elements shown in the FIGS. 1 to 20 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for managing communication by a mission critical data (MCData) server in a MCData communication system, the method comprising:
   receiving, from a first MCData user equipment (UE) of a MCData group, a MCData file distribution (FD) request message including a MCData group identifier (ID) indicating the MCData group;
   checking whether the first MCData UE is authorized to send the MCData FD request message;
   in case that the first MCData UE is authorized to send the MCData FD request message, transmitting, to at least one second MCData UE of the MCData group identified based on the MCData group ID, the MCData FD request message;
   receiving, from the at least one second MCData UE, a MCData FD response message; and
   transmitting, to the first MCData UE, the MCData FD response message.

2. The method of claim 1, further comprising:
   in case that a download completed report indication is included in the MCData FD request message, receiving, from the at least one second MCData UE, a MCData download completed report message for reporting file download completed;
   storing the MCData download completed report for download history interrogation from authorized MCData users; and
   transmitting, to the first MCData UE, an aggregated or individual MCData download completed report message.

3. The method of claim 1, wherein in case that download indication for requesting mandatory download is included in the MCData FD request message, an accepted MCData FD response message is transmitted automatically from the at least one second MCData UE.

4. The method of claim 3, wherein the download indication is used to download a file automatically.

5. The method of claim 1, wherein the MCData FD request message includes at least one of a content payload, file metadata information, information of a target recipient selected by a user of the first MCData UE, and a conversation identifier for message thread indication.

6. The method of claim 1, wherein the MCData FD request message is received from the first MCData UE using hypertext transfer protocol (HTTP).

7. The method of claim 1, further comprising:
   establishing a media plane for file transmission with the first MCData UE;
   receiving, from the first MCData UE, a file data based on the media plane; and
   transmitting, to the at least one second MCData UE, the file data based on the media plane.

8. The method of claim 7, wherein the media plane is released after file transaction is completed.

9. The method of claim 1, wherein data communication between the first MCData UE and the at least one second MCData UE is established through the MCData server in case that the first MCData UE and the at least one second MCData UE are in an on-network data communication system.

10. A mission critical data (MCData) server for communication in a MCData communication system, the MCData server comprising:
    a communicator;
    a memory; and
    at least one processor coupled with the communicator and the memory, and configured to:
      receive, from a first MCData user equipment (UE) of a MCData group, a MCData file distribution (FD) request message including a MCData group identifier (ID) indicating the MCData group;
      check whether the first MCData UE is authorized to send the MCData FD request message;
      in case that the first MCData UE is authorized to send the MCData FD request message, transmit, to at least one second MCData UE of the MCData group identified based on the MCData group ID, the MCData FD request message;

receive, from the at least one second MCData UE, a MCData FD response message; and transmit, to the first MCData UE, the MCData FD response message.

11. The MCData server of claim 10, wherein the at least one processor is further configured to:

in case that a download completed report indication is included in the MCData FD request message, receive, from the at least one second MCData UE, a MCData download completed report message for reporting file download completed, store the MCData download completed report for download history interrogation from authorized MCData users; and transmit, to the first MCData UE, an aggregated or individual MCData download completed report message.

12. The MCData server of claim 10, wherein in case that download indication for requesting mandatory download is included in the MCData FD request message, an accepted MCData FD response message is transmitted automatically from the at least one second MCData UE.

13. The MCData server of claim 12, wherein the download indication is used to download a file automatically.

14. The MCData server of claim 10, wherein the MCData FD request message includes at least one of a content payload, file metadata information, information of a target recipient selected by a user of the first MCData UE, and a conversation identifier for message thread indication.

15. The MCData server of claim 10, wherein the MCData FD request message is received from the first MCData using hypertext transfer protocol (HTTP).

16. The MCData server of claim 10, wherein the at least one processor is further configured to:

establish a media plane for file transmission with the first MCData UE, receive, form the first MCData UE, a file data based on the media plane, and transmit, to the second MCData UE, the file data based on the media plane.

17. The MCData server of claim 16, wherein the media plane is released after file transaction is completed.

18. The MCData server of claim 10, wherein data communication between the first MCData UE and the at least one second MCData UE is established through the MCData server in case that the first MCData UE and the at least one second MCData UE are in an on-network data communication system.

* * * * *